United States Patent [19]

Perry et al.

[11] 4,309,600
[45] Jan. 5, 1982

[54] MACHINE TOOL

[75] Inventors: Charles B. Perry; Raymond L. Bomkamp; Kendall F. Bone, all of Cincinnati, Ohio

[73] Assignee: Cincinnati Milacron Inc., Cincinnati, Ohio

[21] Appl. No.: 54,687

[22] Filed: Jul. 5, 1979

Related U.S. Application Data

[60] Continuation of Ser. No. 83,931, Nov. 26, 1970, which is a division of Ser. No. 690,940, Dec. 15, 1967, Pat. No. 3,543,392.

[51] Int. Cl.³ .............. G06F 15/20; G06K 15/00; G06G 7/64; B23Q 7/00
[52] U.S. Cl. .................. 235/375; 29/33 P; 29/563; 235/376; 235/383; 364/468
[58] Field of Search ........... 235/376, 377, 383, 385; 364/468, 472, 474, 900 D; 235/419, 375; 29/33 P, 563, 568, 564; 198/341, 344, 345, 339; 318/562

[56] References Cited

U.S. PATENT DOCUMENTS

| | | | |
|---|---|---|---|
| Re. 25,886 | 10/1965 | Cargill | 29/33 P X |
| Re. 26,770 | 1/1970 | Lemelson | 29/33 P |
| 2,883,106 | 4/1959 | Cornwell | 235/385 |
| 3,113,404 | 12/1963 | Narel | 51/215 CP |
| 3,144,958 | 8/1964 | Gumpertz | 235/385 |
| 3,188,736 | 6/1965 | Brainard | 29/568 |
| 3,238,615 | 3/1966 | Leone | 29/568 |
| 3,271,840 | 9/1966 | Solski | 29/33 P |
| 3,576,540 | 4/1971 | Fair et al. | 29/563 X |
| 3,854,889 | 12/1974 | Lemelson | 29/33 P |

OTHER PUBLICATIONS

"How Ford Automates Production Lines", American Machinist Publication, pp. 135-150, Mar. 17, 1952.

Primary Examiner—Robert M. Kilgore
Attorney, Agent, or Firm—Norman S. Blodgett; Gerry A. Blodgett

[57] ABSTRACT

This invention has to do with an automatic manufacturing system and, more particularly, to a plurality of work stations to which a variety of workpieces are carried by a network of conveyors, in which means are provided to identify each workpiece and means are provided to direct the workpiece through a path variable in accordance with load conditions in the network having various work stations where selected operations are automatically performed on the workpiece.

5 Claims, 25 Drawing Figures

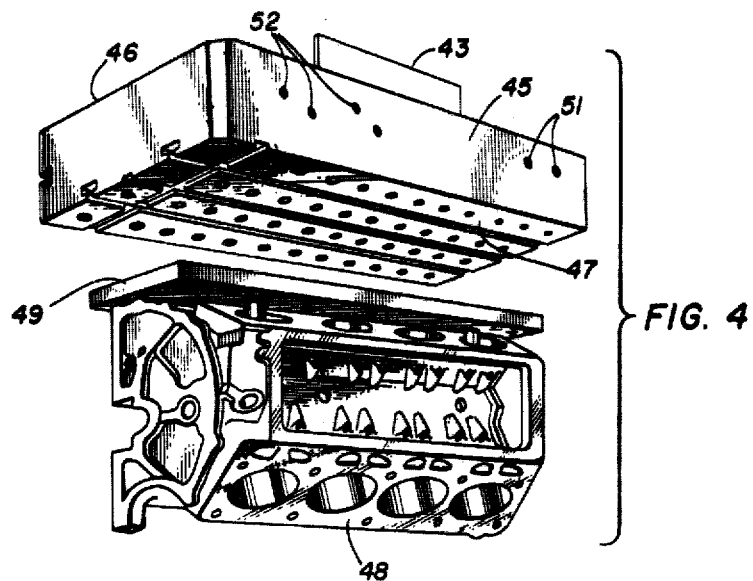
FIG. 4
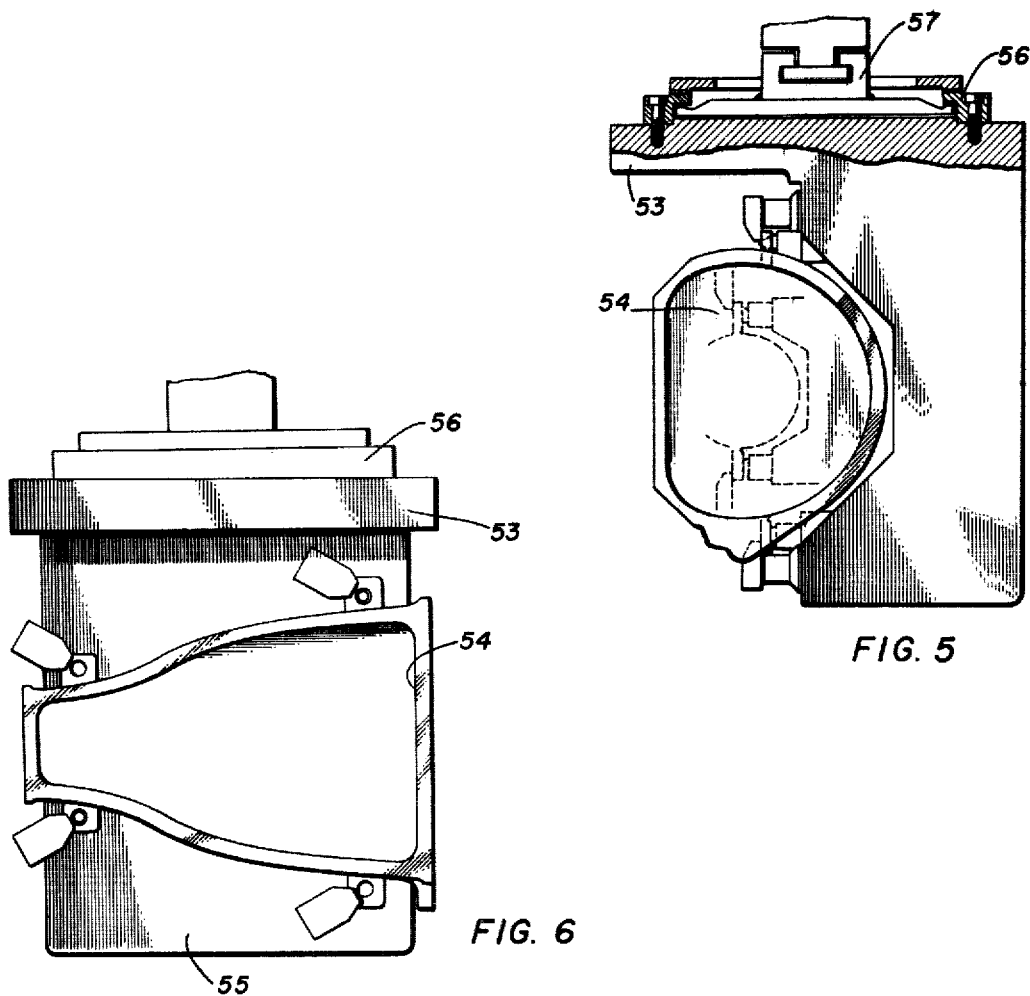
FIG. 5
FIG. 6

CIRCUMFERENTIAL SYSTEM

IN-LINE SYSTEM

MACHINE TOOL

CROSS-REFERENCE TO RELATED APPLICATIONS

This is a continuation of application Ser. No. 83,931 filed Nov. 26, 1970 which is a division of patent application Ser. No. 690,940 filed Dec. 15, 1967, now U.S. Pat. No. 3,543,392.

BACKGROUND OF THE INVENTION

The manufacturing methods and system in use today vary with the total quantity of identical parts that are to be produced. Where production quantities are sufficiently high, it is economically justifiable to provide for automatic machining on transfer lines. At the opposite end of the production quantity spectrum (where a relatively small number of identical items are required), the recently-developed numerically-controlled machines constitute a satisfactory means of semi-automatic manufacturing from an economic point of view. However, no efficient or adequate means are presently available to accommodate manufacturing in those situations where the production rate requirements fall between these extremes.

In the case of machining parts, the manufacturing systems that are used at the present time for providing for these interim production runs are those known as "way-type lines". Such production systems involve an assortment of general-purpose and/or special-purpose machine tools that are usually interconnected by roller conveyors. The production tooling is such that at each station the workpiece can be located and clamped; manpower is required to load and unload each machine tool and to move the workpiece from one machine tool to another. This system of manufacturing has several important deficiencies:

1. The initial investment is high in relation to the productive capacity that can be attained; this is particularly true in those cases where the maximum production rates do not result in good utilization of many of the work stations.
2. The cost of the production tooling at each work station is high.
3. The resulting system is very inflexible and requires a high investment to modify its manufacturing mission.
4. A large amount of manual labor is required to operate the system.
5. Floor space requirements are high, since separate lines normally are used to accommodate variations in configuration or machining operations that may be incompatible with those of other parts.

These and other difficulties experienced with the prior art teachings are overcome in a novel manner by the present invention.

It is, therefore, an object of the invention to provide a manufacturing system which makes possible the automatic manufacturing of parts now being produced with high labor content on way-type lines.

Another object of this invention is the provision of a manufacturing system that has the highest attainable process efficiency without sacrifice of system versatility. Also, the present invention provides a manufacturing system that makes use of work stations designed to give high process specialization and efficiency and further provides a means of automatically applying such stations to a wide variety of workpieces.

It is another object of the instant invention to provide a manufacturing system incorporating means for automatic operation of the entire system; this encompasses routing workpieces from station to station and providing automatic delivery to selected terminal points. The routing system is such that the sequence of movement from station to station may be random, meaning that automatic movement from any station to any other station in the system may occur selectively.

A still further object of the invention is the provision of a manufacturing system in which random order manufacturing can be accommodated, i.e., in which parts that differ widely from one another can be made in a random sequence. Automatic manufacturing of parts on a one-at-a-time basis can be accomplished without sacrifice of system efficiency.

It is a further object of the invention to provide a manufacturing system that can accommodate parts in random sequence, thus resulting in a major reduction in the investment required for production tooling.

It is a still further object of the present invention to provide a manufacturing system having a flexibility rendering it capable of producing parts in quantities of from one to many hundreds and thousands without adversely affecting the cost per part; this added flexibility makes it possible to attain an optimum relationship between varying production schedule requirements and the productive capacity of the manufacturing system.

Another object of the invention is the provision of a manufacturing system consisting of a variety of machine tools interconnected by a network of conveyors in such a manner that a mixture of different workpieces can be introduced into the system and subjected to a number of different machining operations and each machine tool is used to close to its optimum efficiency.

Another object of the invention is the provision of a manufacturing system making use of a network of conveyors joining a wide variety of work stations of varying capabilities, each workpiece cruising through the network to have a variety of operations such as machining, processing, assembly and inspection performed upon it, wherein the most efficient work stations are used when possible and the less efficient only when the more efficient are not available.

Another object of the invention is the provision of a manufacturing system capable of performing a variety of machining operations on a variety of different workpieces, means being provided to select a mixture of particular workpieces and associated production rates for a certain time period, using the various work stations in the system as efficiently as possible.

Another object of the invention is the provision of a manufacturing system providing for changing a cluster of tools where high hole-density appears in machine parts.

Another object of the invention is the provision of a manufacturing system providing for the changing of cluster heads carrying a plurality of tools at fixed center lines, the changing taking place at high speed thereby providing a highly efficient work station.

Another object of the invention is the provision of a manufacturing system using a predetermined arrangement of process specialized work stations usable on a variety of workpieces thus providing high system efficiency and versatility.

Another object of the invention is the provision of a manufacturing system incorporating automatic workpiece routing in a network of conveyors and numerically-controlled machine tools, wherein workpiece identification intelligence accompanies the workpiece during routing and control of the machining operations.

With these and other objects in view, as will be apparent to those skilled in the art, the invention resides in the combination of parts set forth in the specification and covered by the claims appended hereto.

SUMMARY OF THE INVENTION

In general, the present invention comprises a plurality of work stations, a conveyor extending between the work stations, a pallet or fixture movable along the conveyor, and a workpiece attached to a downwardly-directed surface of the pallet or fixture and extending downwardly. More specifically, the conveyor is provided with a staging area in which the pallet or fixture is presented with the said surface facing upwardly for removal of a preceding workpiece, insertion and attachment of the workpiece and after which the pallet or fixture and workpiece are rotated 180 degrees for subsequent movement along the conveyor from one work station to another.

Also, each work station is provided with special registrations means disclosed in the patent application of Perry et al, Ser. No. 690,941, filed Dec. 15, 1967 now U.S. Pat. No. 3,540,566, for Connector. Such an abutment having a downwardly-directed surface which is very accurately located relative to all work stations axes and a connector is provided to lock on upwardly-directed surface of the pallet or fixture to the said surface of the abutment in an accurate predetermined position relative to each other for the performance of a machining operation on the workpiece. In addition means is provided to rotate the pallet or fixture and workpiece through predetermined angles about a vertical axis for performing machining operations at such angles.

Identification means is provided on each pallet or fixture and identification reading stations are located at key points along the conveyor for reading the identification means and conveying such information to a control center or data source from which machine address instructions are drawn to regulate routing and the performance of machining operations. A control means is provided for relating a given pallet or fixture identification to a specific workpiece and for providing for movement of the pallet or fixture and workpiece along the conveyor for the performance of the operation, all in accordance with a predetermined program associated with the specific workpiece.

The connector for joining the pallet or fixture to the work station of a machine tool, for example during machining, includes a circular array of radial teeth associated with the special registration means or abutment of a copending application noted earlier and a similar circular array of radial teeth associated with the pallet or fixture. Means is provided for bringing about relative movement between the circular arrays to bring them in and out of locking engagement and means is provided to bring about a selected rotary indexing movement between the circular arrays on occasion. It is contemplated that some of the work stations of machine tools, for example, be provided with a similar connection between its tools and a spindle and between certain attachments and a part of the machine tool.

Furthermore, a ready-access memory bank is associated with the control center or data source, and means is provided to transfer instructions therefrom relating to a particular workpiece as it enters the conveyor network, and means is provided to send instructions relative to routing and control of work stations when the particular workpiece arrives at that particular station.

One or more stations are provided in the conveyor network to clean at least the connector associated with each pallet or fixture.

Some of the machine tools in the system are equipped to automatically exchange cutting tools, multiple spindle drill heads and machine accessories. Such machines may be equipped with a bulk storage of large capacity of such exchangeable items associated with the machine tool at a distance remote from the spindle and a ready-access storage of small capacity located close to the spindle. A control means is provided to ascertain the items that will be needed at the spindle within a short time and the order in which they will be needed and operating to transfer the items from bulk storage to ready-access storage in the necessary order. The control means acts to inhibit the further formation of a queue in ready-access storage when the next item which is to be added to the queue is ahead of that position in the queue. This inhibition takes place until the said next item has progressed to the machine tool spindle, has taken part in the machining operation and has been transferred to ready-access storage to rejoin the queue.

Generally speaking, the invention contemplates the use of a mixture of machine tools, some of them being designed for very specialized process (rather than workpiece) machining operations though collectively providing the system with high versatility. More specifically, one machine tool might be equipped to perform face milling operations. Such a machine would have a single heavy-duty spindle operating at high horsepower. Another machine might be a drilling machine equipped automatically to exchange cluster heads each having light-duty spindles in a predetermined pattern collectively operable at compatible horsepower and speed ranges. Still other machines might be of a single-spindle design with multiple tool storage and a tool changer associated therewith.

It is contemplated that a pallet or fixture with its workpiece can be returned to the staging area for removal and remounting in a different orientation of the workpiece on the pallet or fixture. After such remounting and reorientation the workpiece re-enters the system. Normally, such reorientation involves mounting the workpiece in a differing fixture.

Each machine tool has a branch conveyor associated with it and control means is provided for directing workpieces along the conveyor network and into branch conveyors in accordance with a predetermined primary program; means is provided for sensing the accumulation of a queue of pallets or fixtures in each branch and acting in response to a predetermined queue length in one of the branches to shift to a contingency program for those workpieces that would otherwise enter that branch, The contingency program calls for the operation being performed on an alternate machine tool which may be less efficient but is available. The contingency program may also call for the immediate performance on the workpiece of an operation that, according to the primary program, otherwise would be performed after the operation performed by the particular machine tool in the said branch conveyor.

Each branch conveyor is provided with a removable section which brings the pallet or fixture under the machine tool registration means or abutment and is movable away from the work area after the connector is operative to suspend the pallet and workpiece from the registration means or abutment.

The method of controlling the individual machines and the means of delivering workpieces between the machines in the manufacturing system of the invention differs rather radically from the present state of the art. Numerically-controlled machines in use today rely on a tape usually 1-inch, 8-channel perforated tape, mounted in a tape reader at the machine as a means of in-putting machine commands. The machine is prepared to produce a series of identical parts by mounting the appropriate cutting tools in the tool storage system and a tape with the machine control instructions thereon in the tape reader. The tape is advanced on a block at a time basis, the machine executes the commands relayed to it from the tape. At the conclusion of the run of the tape, the tape is rewound and the process repeated for each part produced. The control philosophy for the present manufacturing system is such that random parts (different part numbers in a random sequence) will be produced by each work station. This means that tapes containing the instructions for a particular part number cannot be used as machine control input means. Random order manufacturing also means that the number of different cutting tools that must be available for use in a given period at the machine must be compatible with the requirements of all the part numbers currently being produced on that work station. The present manufacturing system also imposes unique requirements in respect to controlling the movement of workpieces between machines. The present state of the art in applying N/C performs this task by manpower and, in general, today's numerically-controlled machines are conceived around performing most of the operations required by the workpiece at one station. The philosophy of the present invention is to achieve a higher efficiency in metal cutting by specializing the stations. Hence, a particular part will normally pass over many such specialized stations. This, in turn, generates the requirement for control of workpiece movement and necessitates the system capability of being able to move from any work station to any other work station.

In order to improve the chip cutting time of all the stations in the present system, the principle of queuing is used and this requirement to queue ahead of each work station imposes special conditions upon the work movement system and the system control logic.

Another control feature of the invention is the ability to accommodate automatically short term over-loads of particular modules, or the occurrence of an unscheduled event, such as a machine breakdown, or other event that may necessitate the short term removal of a work station from an on-line"status". This capability is referred to as "contingency programming". The details of its operation and the way in which it makes use of an off-line computer and the logic requirements it imposes upon the central data source will be described hereinafter.

Another special control requirement of the system is the ability to meet the special system control problems imposed by a cluster head drilling module. This module handles large numbers of multiple spindle heads in such a manner that they can be automatically exchanged and applied to workpieces. The problems associated with a high density random access storage of such heads and the means of rapidly exchanging them in the spindle and returning to storage requires special features in the control system to accommodate. The basic control concept used to solve the special problems of the cluster head involve the following:

1. Identify the workpieces approaching the module upstream of their arrival at the module;
2. Search the tool logic unit memory bank for the location of the required tools for each part number approaching the station;
3. Bring about the progressive removal of the required tools in the sequence that they will be used from the storage matrix into an inflowing queue line moving the tools toward the spindle;
4. As tools are applied to the work, provide for their release from the spindle and return in a separate queue back towards the storage matrix;
5. Remove tools from the return queue and place them back in the storage matrix.

BRIEF DESCRIPTION OF THE DRAWINGS

The character of the invention, however, may be best understood by reference to one of its structural forms, as illustrated by the accompanying drawings, in which:

FIG. 4 is a perspective view of a pallet and workpiece arrangement forming part of the invention, FIGS. 5 and 6 are end and side views, respectively, showing a fixtured pallet for holding workpieces different from that shown in FIG. 4, FIGS. 7 and 7A are perspective views of machine tools forming parts of the invention, FIG. 10A is a perspective view of a modification of a portion of the machine tool shown in FIG. 10.

DESCRIPTION OF AN EMBODIMENT OF THE PRESENT INVENTION

Figure 1:
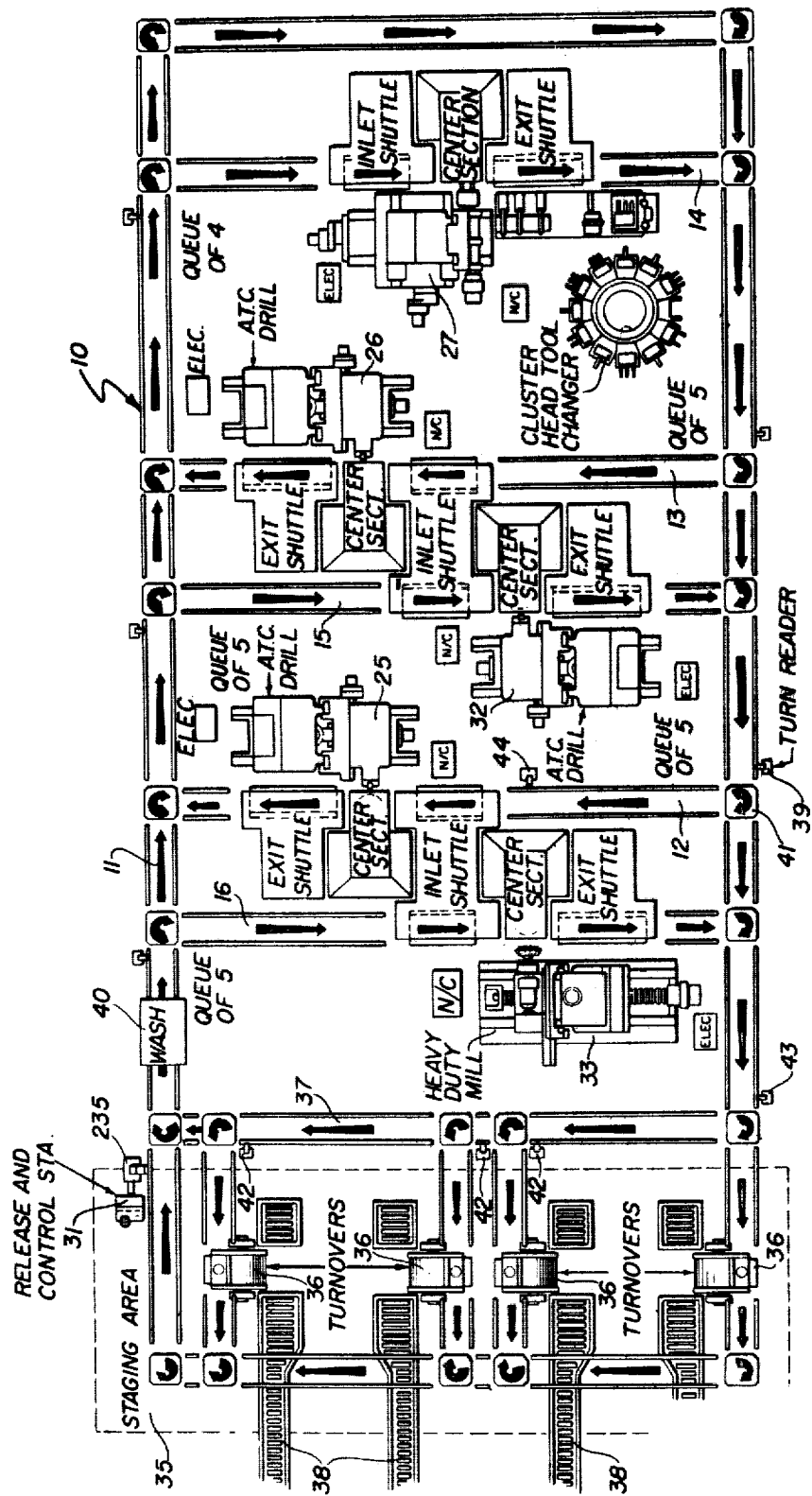
FIG. 1 is a plan schematic view of a manufacturing system embodying the principles of the present invention.
Figure 2:
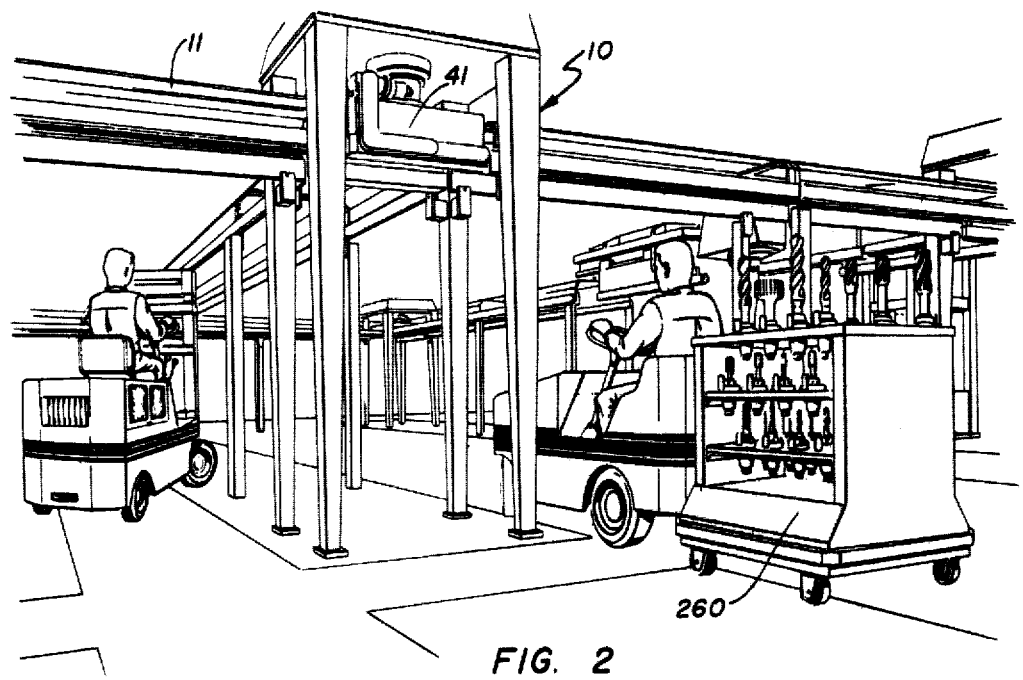
FIG. 2 is a perspective view of the system.
Figure 3:
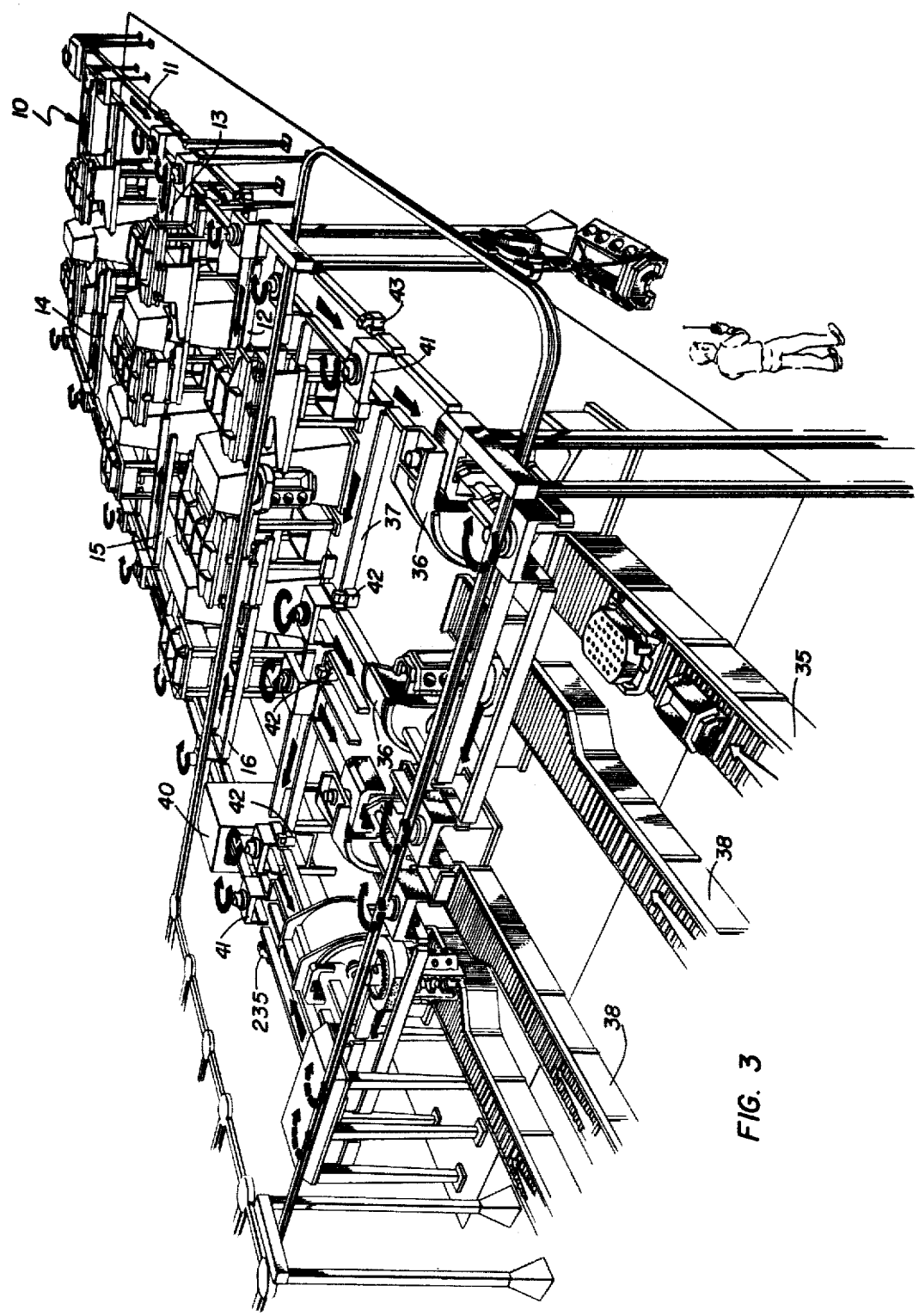
FIG. 3 is a perspective view of a conveyor forming part of the system with machine tools removed for clarity of understanding.

Referring first to FIGS. 1, 2, and 3, wherein are best shown the general features of the invention, the manufacturing system, indicated generally by the reference numeral 10, is shown as including a primary loop system or conveyor 11 in the form of a loop and a plurality of secondary or subsystem conveyors 12, 13, 14, 15, and 16. The purpose of each of the secondary or subsystem conveyors is to deliver work to and from specific work stations. For instance, the subsystem conveyor 12 services a work station 25, the subsystem conveyor 13 services a work station 27, the secondary conveyor 15 services a work station 32, and the conveyor 16 services a work station 33. One end of the primary or main conveyor is reserved as a staging area 35 at which the workpieces are prepared before introduction into the network of conveyors. This portion of the conveyor is associated with at least two turnover stations 36 and a wash station 40. A by-pass conveyor 37 extends across this end of the conveyor and permits workpieces to move around the loop without passing through the staging area. At the same end of the main conveyor it is provided with incoming work branches 38 by which finished workpieces are caused to pass to various remote places of use or storage. As is evident on the drawing, the flow of workpieces along the main conveyor is in the clockwise direction, as viewed from above. Each subsystem conveyor has its entrance "upstream" of its exit.

In the main conveyor immediately ahead of the intersection of the entrance of each cross conveyor with the main conveyor is an identification reader; for instance, a primary identification reader 39 is associated with the intersection of the entrance to the subsystem conveyor 12. The reader 39 transmits the identity of the pallet or fixture to the system control center or data source which, in turn, releases an appropriate signal to the turntable 41 which also serves the entrance to the subsystem conveyor 12. If the work is not to be addressed to the conveyor 12, then the signal to turnstyle 41 would be to permit the pallet or fixture to pass through on the main conveyor system.

Similar primary identification readers 42 are located ahead of each turnstyle within the distribution network where the distribution branches 38 leave the main conveyor. These readers transmit pallet or fixture identification data to the system control center or data source to obtain appropriate instructions for that particular workpiece relative to routing within the distribution network. Another primary identification reader 43 is located at the entrance to the by-pass conveyor 37 to transmit pallet or fixture identification data to the control center or data source to control either entry into the staging area 35 or by-pass into the loop 37.

A secondary identification reader is located in each of the subsystem conveyors just ahead (upstream) of the work station; for instance, a secondary identification reader 44 is located in the subsystem conveyor 12 in conjunction with the work station 25. This reader, by reading identification coding associated with the pallet or fixture determines whether or not it is properly in the subsystem conveyor 12 moving toward the work station 25. Once the presence of a particular workpiece is redundantly checked or determined to be correct, the control center releases appropriate data as soon as that workpiece is in registration at the work station, thus providing for the suitable numerical control of the work station 25 in performing the preselected machining operations on the workpiece. It will be understood that the work stations can be in the form of machine tools that perform machining operations or can be in some other form, such as an inspection station for testing the accuracy of machining operations previously performed on the workpiece.

In the previous discussion, the pallets or fixtures have been described as moving along the conveyors with the workpiece mounted on the lower surface of a pallet. The pallet or fixture is the member which actually makes contact with, is supported by, and is propelled by the conveyors. For instance, in FIG. 4, the pallet 45 is shown as being plate-like in form and rectangular in plan. It has an upper surface 46 upon which registration means 43 is provided as described in a previously noted copending application and a flat lower surface 47. In FIG. 4, a workpiece 48 is shown in position to be attached to the pallet 45. The workpiece 48 (shown for the purpose of illustration as the block of a V-8 automobile engine) represents an unstable part in respect to mounting in the required orientation as to the lower surface of the pallet 45. The workpiece is shown as being carried by a mounting plate 49 which is used to attach it to the pallet. After the pallet and workpiece have passed through the manufacturing system and all of the machining and inspecting operations have been performed, the workpiece is removed from the mounting plate or fixture 49. Carried on a side surface of the pallet or fixture is an identification code means 51 (See also FIG. 20). A magnetically neutral surface is attained by having a code implemented by pressure or absence of slugs 52 of a material representing a poor transmitting medium for magnetic flux. The reading of the code is accomplished by the use of proximity sensing heads whose output is responsive to the magnetic flux path transmitting characteristic of the material in front of the head. The operator at the staging area knows the part number of the particular workpiece that is mounted on a particular numbered pallet and he introduces this information into the system control center so that, as the pallet and workpiece cruise through the conveyor network, the equipment, by reading the coded number of the pallet, knows what workpiece is present and can give the proper instructions to direct the pallet to the appropriate next address and controlling the performance of the appropriate operations at each work station in accordance with a predetermined stored program for that particular numbered part or workpiece. The mounting of the workpiece on the pallet must be done accurately. The means of accurately locating the pallet or fixture at each work station are described in detail in a previously noted copending application disclosing registration means.

FIGS. 5 and 6 show a similar pallet 53 to which a workpiece 54 is attached. This workpiece is shown as being adapted to the pallet by means of fixture 55 which is integral with the pallet. The upper surface of the pallet is provided with the lower portion 56 of a connecting means 57.

Figure 7:
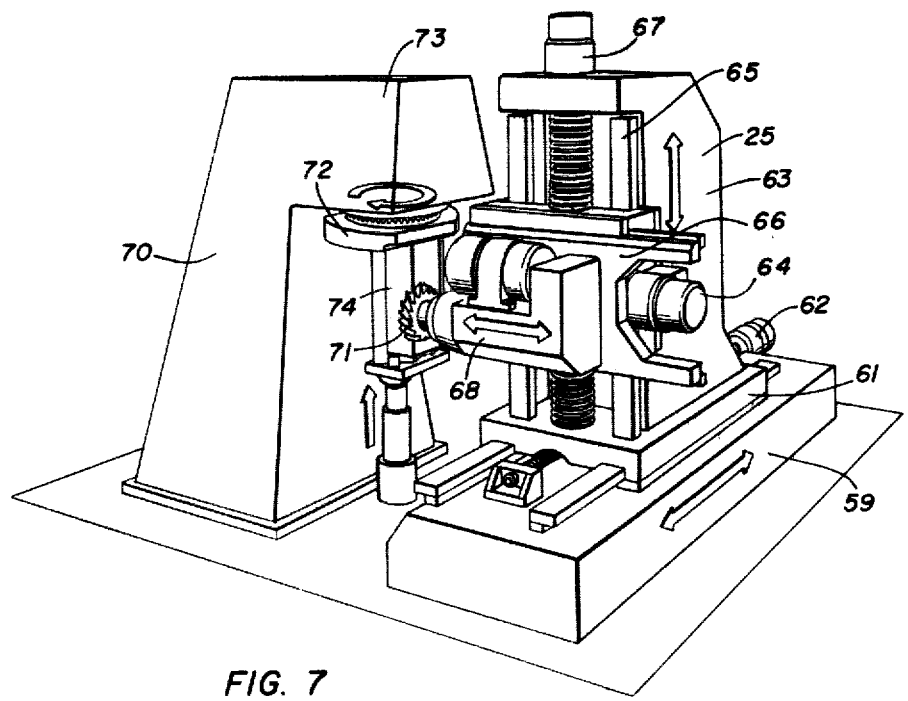

FIG. 7 shows the construction of the work station 25 which comprises a heavy-duty milling machine module and associated center section 70 for registration and support of the workpiece. On the base 59 is mounted an x-motion slide 61 operated by an actuator 62. A column 63 is mounted on the slide 61 and a saddle 66 for z-axis movement therewith under the impetus of an actuator 64. Vertical ways 65 are provided on one side of the column for y-axis movement of the saddle 66, the movement being brought about by an actuator 67. A horizontal spindle carrier 68 is mounted on the saddle 66 and driven by a large motor 69. A center section or inverted support 70 is provided to one side of the column and cutter. On the end of the spindle is mounted a face-milling cutter 71. A pallet 72 is suspended from an abutment 73 with the center section 70 associated with the work station 25 and a workpiece 74 is mounted on the underside of the pallet, so that at least one of its faces can be milled flat by the cutter. Other workpieces wait with their pallets in a queue to receive a machining operation at the work station. It can be seen, then, that this work station is provided with a machine tool which does one class of machining work very efficiently (heavy duty milling operation). It is a specialized machine and is simple, rugged, and inexpensive.

Figure 7A:
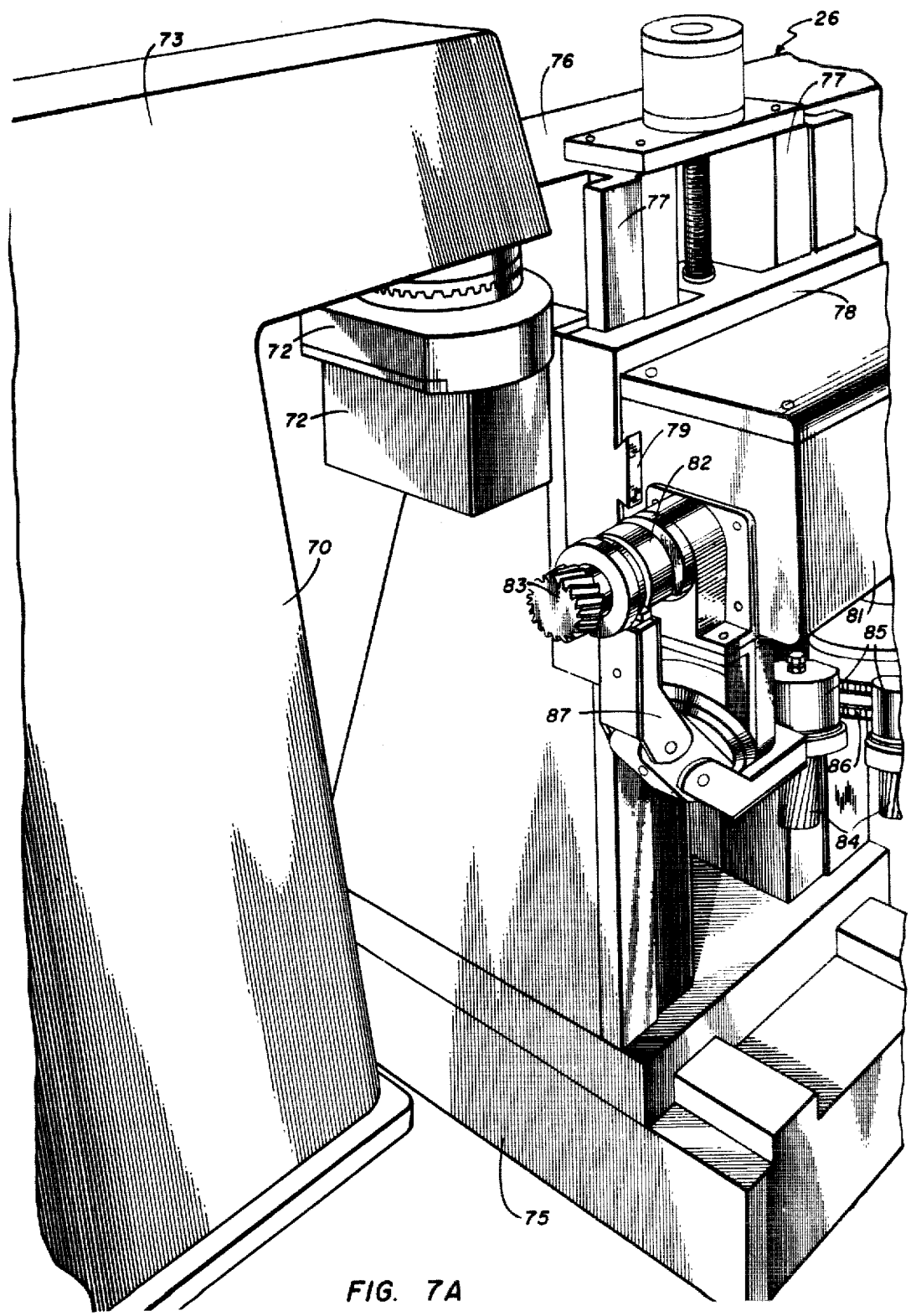

FIG. 7A shows some detail of the work station 26. The base 75 is provided with a vertical pedestal or column 76 which is capable of x-axis travel relative to the base and which is provided on one side with vertical ways 77 on which is mounted a saddle 78 capable of y-axis movement. The saddle has a way 79 on which is mounted a spindle carrier 81, the carrier having z-axis movement along the way. Mounted in the carrier is a spindle 82 adapted to carry a tool 83; a large number of such tools 84 are stored under the spindle carrier and are carried in sockets 85 provided on an endless chain 86. The chain is suitably guided and driven for movement in a generally horizontal plane toward the bottom or along the underside of the carrier. A tool interchanger 87 is mounted at the front end of the carrier to transfer tools back-and-forth between sockets on the storage chain 86 and the spindle 82. A workpiece 74 is suspended in the machining area from its pallet 72, which, in turn, is connected to the underside of another abutment 73 fixedly related to another center section 70.

It can be seen, then, that the work station 26 is another extremely efficient specialized work station capable of performing any of a large number of machining operations constrained by a maximum diameter and available horsepower. The primary function of this module is to perform hole generating and processing operations compatible with single tool processing or machining operations. To perform these operations, design emphasis is slanted toward attainment of a wide range of spindle speeds, high-speed tool changing, and dynamic operation of the relatively light-weight spindle carrier that does not have to contend with high radial forces such as encountered during heavy duty milling with a large cutter. A specialization of work station processing, combined with workpiece versatility, is an important improvement of the features of the present invention.

The single spindle tool changing module or work station 26 is equipped with a random access tool storage matrix. This matrix is mounted on the underside of the spindle carrier. The storage matrix design is such that it can bring into transfer position any desired tool. At the time of programming, each unique cutting tool is assigned a code number. This number defines not only the cutter, but the cutting tool adapter, the amount of protrusion from the adapter (the tool offset), any adapter that is required between the tool holder and the spindle adapter; in short, all information required to prepare the cutting tool in its tool holding system. This tool code number is inserted on the program manuscript for subsequent electronic delivery from the central data source to the machine module whenever a part number requiring that particular tool is active in the system. The code number is also used in conjunction with a tool classification manual so that the cutting tool and its holding system can be preassembled in a tool crib, in a manner corresponding to that required by the programmer.

At any given time in the operation of the total manufacturing system, an assortment of cutting tools is loaded into the single-spindle tool changing modules. At the time of this loading of cutting tools and their holders into the storage matrix of these machines, the tool storage logic system would relate the identity of the tool (the number called for by the programmer and on the part program) with the storage pocket location in the machine's storage matrix.

As the parts are machined on the single-spindle tool changing module, the identity of the next tool to be used would be dispatched from the central data source and through the tool holder logic system results in a rotation of the tool storage to the appropriate position occupied by the desired tool. This delivers the next tool to be used to the transfer position of the system.

As soon as the last application of the cutting tool in the spindle has been completed, an interchange is implemented exchanging the position of the tool in the spindle with the cutting tool in the transfer position of the storage matrix. At the end of this cycle, the tool that was in the spindle is placed in the storage pocket location in the storage matrix that was formerly occupied by the tool now in the spindle. The tool storage logic system now assigns the location of the formerly used tool to the position in the storage matrix it now occupies. The details of the operation of the tool storage logic system in keeping track of where the tools are in the storage matrix and in the interchange system is as follows:

Sequence of Operations for a Swing-Twist or a Double-Arm Tool Changer Without Intermediate Queues 1. Read new tool number to accumulator (ACC);
2. Set address BEG (beginning) to memory address registry (MAR);
3. Read tool number from BEG (beginning) to machine data registry (MDR);
4. Compare the machine data registry (MDR) with accumulator (ACC);
5. If there is no comparison, then increment memory address register (MAR);
6. Read the new tool number into the machine data registry (MDR) and repeat the comprison;
7. If equivalence is found, the memory address registry (MAR) contains the required address of the tool in the tool storage location and a positioning command is transmitted to the tool storage;
8. Upon an indication of tool positioning in storage, a tool number interchange occurs;
9. Transfer memory address registry (MAR) to machine data registry (MDR);
10. Set memory address registry (MAR) to address FIX;
11. Store machine data registry (MDR) to FIX;
12. Transfer accumulator (ACC) to machine data registry (MDR);
13. Set memory address registry (MAR) to address of spindle (SPD);

14. Read spindle address (SPD) to machine data registry (MDR);
15. Store accumulator (ACC) to spindle address (SPD);
16. Machine data registry (MDR) to accumulator (ACC);
17. Set ADD FIX to memory address registry (MAR);
18. Read FIX to machine data registry (MDR);
19. Transfer the machine data registry (MDR) to the memory address registry (MAR);
20. Record accumulator (ACC) to memory location labelling the tool location in which tool has just been interchanged with spindle.

Figure 8:
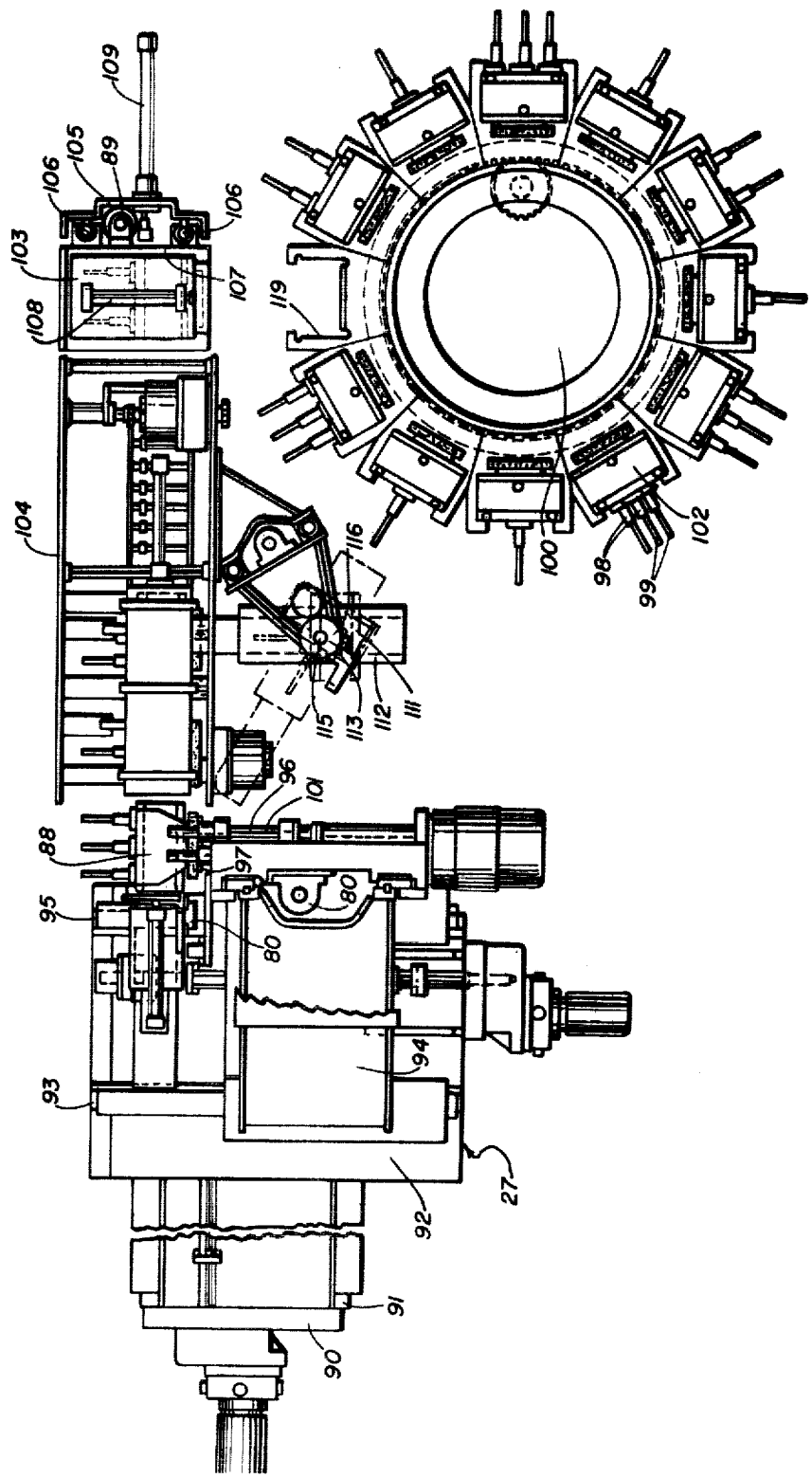
FIG. 8 is a plan view of another machine tool used in the invention.
Figure 9:
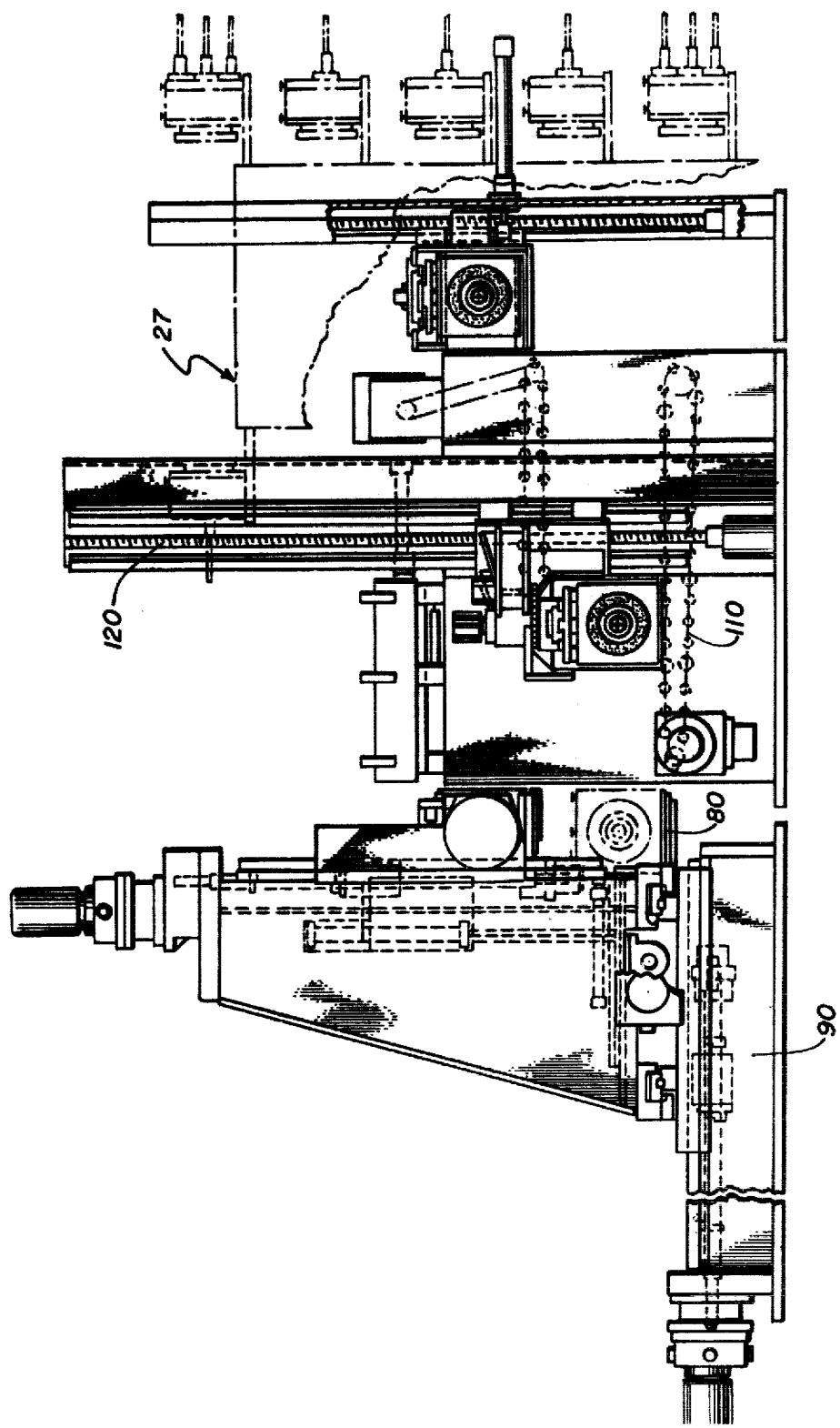
FIG. 9 is a rear elevational view of the machine tool shown in FIG. 8.

Referring to FIGS. 8 and 9, the work station 27 is shown as a machine tool in which holes are processed by cluster heads or tool modules which are automatically exchangeable. The machine tool is of the type shown and described in the copending patent application of Perry, Ser. No. 690,942, filed Dec. 15, 1967, for MACHINE TOOL and is provided with a base 90 having slide ways 91 upon which a saddle 92 is movable horizontally (X-axis). An upper surface of the saddle is equipped with transverse ways 93 upon which a column 94 is movable in the transverse (Z-axis) direction. On one side of the column 94 are mounted vertical ways 95 upon which a spindle carrier 96 is mounted to be movable vertically (Y-axis). The face of the spindle carrier is equipped with a circular abutment 97 for accurately registering and supporting the cluster heads or modules. Each module is provided with one or more spindles 98 and tools 99 rotatably driven. The power to rotate the spindles and the tools enters the cluster head rear by engagement thereof with a drive shaft 101.

The drawings show a storage matrix or magazine generally indicated by numeral 100. This storage magazine provides random access for a plurality of modules 102. Each of these modules 102 may be equipped with a plurality of cutters or tools 99 mounted at predetermined locations and driven at predetermined speeds as required to perform hole processing operations simultaneously on multiple locations of a workpiece. This storage matrix includes a multi-level circular storage arrangement illustrated by these views. Tool modules 102 are selectively removed from storage magazine 100 by an elevator and transfer system 103. This system 103 is capable of removing any module from any level of the storage magazine and delivering the module to an in-flow queue line area 104. The elevator and transfer system 103 includes a support 105 having vertical ways 106 along which a saddle or carriage 107 traverses. The carriage is driven by a ball screw and motor 89. A hydraulic cylinder 108 on the carriage 107 effects transfer of a predetermined module 102 from a particular level of the storage magazine radially outwardly thereof and then rises or descends to a co-planar relationship with other modules 102 already arranged along the in-flow queue area 104. An actuator 109 is suitably mounted and operable to shift a module laterally into the in-flow queue line area 104 which has a cover or shroud over at least a portion thereof. Each storage magazine level may be independently rotatable in a "lazy susan" manner or all levels may be rotated simultaneously, so that modules that will be required subsequently can be brought into radial position for service accessibility by the transfer carriage 103. These positioning operations can be performed concurrently while other levels of the storage matrix are either discharging or receiving cluster head assemblies.

Suitable electronic control for energization of matrix and transfer components is provided. This electronic capability provides the means of relating unique identity of each head to a particular location in the random access storage matrix. It also keeps track of where each cluster head that is discharged from the matrix is located as it moves along the in-flow queue area to the cluster head registration means 97 and then along a return gueue line 110 back into the storage matrix.

This electronic capability is such that tools can be placed in the most readily accessible storage location, it not being necessary to return the tool modules to the same location from which they were previously taken. The address or location of each unique module is electronically subject to continual mutation thus contributing to system flexibility and efficiency. Each module is pulled by arm means 88 toward the spindle 96 having connector means or circular abutment 97 in accordance with co-pending patent application, Ser. No. 690,941, Perry et al, filed concurrently herewith.

Upon arrival of the spindle carrier 96 at the cluster head transfer position, the module which has just been used is shifted by an elevator means 80 to a lower level positioned for entry into the return queue line 110. Used cluster heads in the return queue line 110 are moved laterally into alignment with a storage return transfer apparatus 111. The cluster head is picked up from the return queue line transfer position by a laterally shiftable member 112 having plural undercut slotted portions that engage multiple studs with enlarged heads or gripable ends on the module. The shiftable member 112 is movable both linearly and pivotally to effect cluster head movement into differing predetermined positions during transfer to the storage magazine 100. Linear movement occurs to effect transfer of the used cluster head from the return queue line followed by concurrent pivotal movement around an axis 115 shared by a drive motor 116. An external gear segment 113 and motorized driver effect turning through a predetermined arcuate distance about the axis of motor 116. Drive motor 116 drives a pinion gear which impinges upon a rack to effect linear transfer radially to an appropriate storage compartment 119 of one tier of storage matrix 100. Transfer of the tool module into the jurisdiction of the storage compartment is accomplished sequentially by operation of a motorized ball screw 120 which causes raising or lower'ng of a carriage into a level at which radial movement of the used cluster head occurs to the storage matrix. The motor 116 drives the pinion gear impinging upon the rack which shifts the cluster head assembly laterally or radially into a storage location. The motorized ball screw 120 is then operated to cause the carriage to descend and deposit the cluster head assembly into the storage compartment 119. Still further lowering of the carriage provides clearance between enlarged stud heads and undercut slots for release of engagement therebetween. Upon attaining such release, the energizing of motor 116 is used laterally to withdraw the transfer plate assembly or shiftable member 112 from the storage location.

It is to be understood that for some installations the so-called "lazy susan" type storage means 100 as well as transfer and elevator system 111 may be omitted. Then, the return queue 110 for cluster heads is extended for transfer of such cluster heads back to the elevator and transfer carriage 103. Also, it should be further understood that the "carrousel" storage means 100 may be present in a system without the transfer and elevator system 111 in which case the elevator and transfer system 103 is used both for loading and unloading of cluster heads.

These three options permit the design to be tailored very specifically to the requirements of a particular installation. Where the total number of cluster heads is low, no "carrousel" storage system 100 would be required since the capacity of the in-flow and return queue line is adequate, assuming sequence of cluster head usage applied remains fixed for a given period of a system application. The "carrousel" storage means would be present, but the elevator and transfer means 111 omitted whenever the mean consumption of tool modules (transfer and metal cutting time) is compatible with the load and unload time of the elevator and transfer carriage or device 103.

It should be further understood that the storage capacity of the "carrousel" or "lazy susan" storage means may vary widely and yet be within the scope of the features of the present invention as herein disclosed. The capacity per deck or per tier or level of storage means can be varied. Preferred numbers, as a "power" of the numeral 2, i.e., 2, 4, 8, 16, etc., are compatible with binary control logic for data storage and manipulation as is required to "remember" the discrete address of each unique cluster head assembly in the storage matrix.

Figure 10:
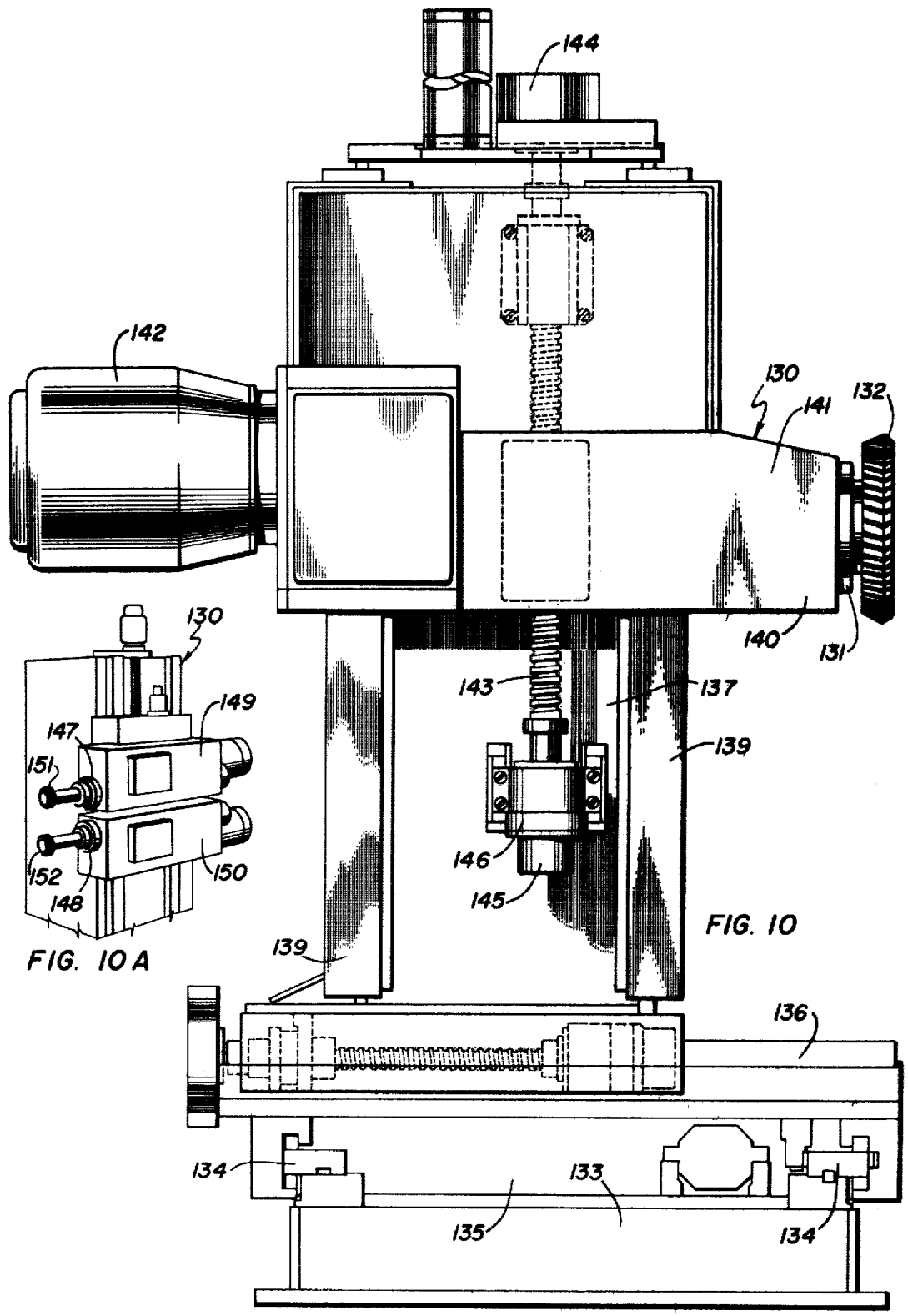
FIG. 10 is a side elevational view of another machine tool used in the invention.

FIG. 10 illustrates a machine tool generally indicated by item 130. This configuration is suitable for the positioning of a rotary spindle 131 in three linear axes. With minor variations, this configuration is suitable for driving a series of different classes of cutting tools: a milling cutter 132 is shown; however, this configuration of machine can also be used for driving boring tools, facing tools, and other types of rotating metal cutting tools. The machine illustrated in FIG. 10 can be used in this configuration for various classes of milling work. For example, a heavy duty milling module, a medium duty milling module, and a light duty module. Other versions of the machine will be used for precision milling operations in which emphasis will be slanted towards getting very high accuracy on the workpiece. Still other versions will substitute a milling spindle with a precision boring spindle.

The machine tool 130 is composed of a base 133 which supports longitudinal ways 134 upon which a saddle 135 moves in the X-direction. The function of the saddle is to provide a support structure for the Z-axis way 136. A column 137 is mounted on anti-friction rollers 138 riding on the way 136. On the side of the column 137 are mounted vertical ways 139 upon which a saddle 140 mounting carrier 141 is carried. This saddle 141 also carries the spindle 131 and a drive motor 142.

All axis movements on the three axes are driven by preloaded ball screw and nut assemblies similar to the assembly 143 showing the ball screw used on the vertical axes. The screw is driven by a servo motor 144 sitting on top of the column structure. At the opposite end of the screw is a tachometer 145 generating a signal proportional to the speed at which the screw is rotating. Also mounted on the lower end of the screw is a bearing housing support 146.

As previously described, a variety of different metal cutting machines will be built in accordance with the general configuration described and illustrated in FIG. 10. Each module built in this general configuration is designed so as to optimize the driving of a particular group of cutting tools in order to achieve very high metal cutting efficiency. The drawing illustrated in FIG. 10 is that of a machine conceived around performing boring and some milling operations with very high efficiency. The emphasis in the design of the mechanical elements of the machine would be around achieving very high rigidity in order to contain the reaction forces generated in the cut area with minimum machine deflections. Other machine tools built to this general configuration will have the bare design emphasis slanted in still other directions. For example, a precision milling module would have the design emphasis aimed at achieving very high accuracy without the requirement for high metal removal rates. Although these two milling machines would look essentially alike, the design and construction emphasis would provide these different application process efficiencies. In the case of using this general machine configuration for precision boring operations, an entirely different spindle carrier system would be applied to the column structure. Such a spindle carrier may or may not be equipped with an automatic tool changer, a principle for automatically changing cutting tools as described elsewhere in this disclosure. In the case of the boring spindle, the emphasis in the design would be aimed at achieving very close control of spindle runout and a very accurate control of the Z-axis movement linearity in order that holes very round, straight and to close diameter control can be generated.

The principle of process specialization of each of the machine tools used in a manufacturing system in accordance with the invention is carried considerably further than has been characteristic of the present state of the art in the design of machine tools. The present state of the art in the design of milling machines, for example, is to provide a wide range of spindle speeds and feed rates, and to design a spindle nose suitable for accommodating a variety of different types of cutters. Such machines are highly versatile, but are limited in metal cutting efficiency due to the compromises in their design required to achieve versatility. The philosophy of this manufacturing system is to achieve the highest possible degree of specialization within the performance of each machine tool module and to achieve versatility by the mix of such specialized modules present in a particular system. By this combination, it is possible to achieve the twin results required, i.e., very high metal cutting efficiency on the one hand and high versatility of the system on the other hand.

This principle of process specialization is exemplified in FIG. 10A, wherein there is illustrated aversion of the machine tool 130 modified by the addition of two boring spindles 147 and 148. These spindles and their associated carriers 149 and 150, respectively, are identical except for the fact that the spindle center line of the lower carrier 150 is inverted. With this arrangment, the two spindle center lines can be brought very close together. Mounted in the two spindles are cutting tools 151 and 152, respectively. The center-line in center-line separation distance of these two spindles is adjustable as a numerically controlled programmable variable. The vector distance separating spindle center line of carrier 149 from that of carrier 150 is defined as axis Y-A. The Y-A axis is in the same vector direction as axis Y which governs the position on the column of the two spindle center lines. The procedure for applying this configuration of machine is to numerically call for the axis Y-A to be varied to a predetermined value under closed loop servo operation of the numerical control system. This separation distance would be controlled to very high accuracy using a high resolution linear position transducer. Having established the appropriate spindle center line to center line separation distance as governed by the requirements for a particular application on workpieces, the two spindles would be moved concurrently with the separation distance locked in the Y axis direction. In other words, it is possible with this arrangement to engage the two spindles with a controlled separation distance between them into various areas of a workpiece.

The dual spindle machine illustrated in FIG. 10A will be used to achieve the point objectives of high process efficiency and high productivity on workpieces such as engine blocks wherein it is desired to perform roughing and semifinishing boring operations on more than one cylinder bore at the same time. The addition of the second spindle assembly doubles the productivity of the station for a relatively small incremental cost increase of the machine. This configuration of machine will also be useful for many other metal cutting assignments besides the boring of cylinder holes. An example of some other applications would be the generation of bored holes for spindle bearings, shaft centers, and the like.

It is to be understood that the general configuration of the machine illustrated in FIG. 10A is not limited to applications in which axis Y-A is locked after being set at a predetermined separation distance. This axis can be cynamically varied during a metal cutting operation. An example of the usefulness of this capability would be the milling of a part flange in which the center line of the cutter could be kept on two opposing flanges by dynamically varying the separation distance as the cutters move from left to right on the workpiece.

It is to be further understood that the machine illustrated in FIG. 10A may or may not be equipped with an automatic tool changer. The description of a suitable tool changing system for use on such spindle carriers is illustrated elsewhere in this disclosure.

Figure 11:
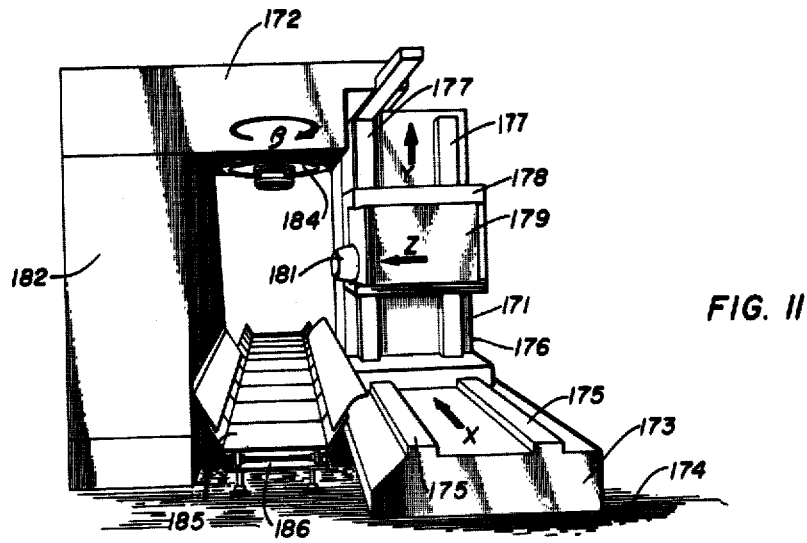
FIG. 11 is a perspective view of a typical machine tool and associated equipment as used in the practice of the invention.

FIG. 11 shows the manner in which a work station 171 is provided with a pallet-supporting abutment 172. The work station 171 consists of a machine tool having a base 173 adapted to be bolted to a foundation such as a floor 174. The base is provided with X-axis ways 175. Slidably mounted on the ways is a pedestal 176 having vertical ways 177 which carry a saddle 178 for Y-axis movement. On the saddle is mounted a block 179 in which is carried the spindle 181 for Z-axis motion. Also mounted on the floor is a massive pedestal 182 from the top of which extends the abutment 172. On the abutment is mounted the upper portion 184 of a connector, a lower portion of which is carried by each pallet; the construction of the connector will be described more fully hereinafter. Although the conveyor is not shown in this view, it will be understood that it extends past the machine tool at the level of the bottom surface of the abutment 172 and the upper portion 184 of the connector. Underlying the conveyor is a chip trough 185 which is supported on a frame 186 which rests on the floor 174 between the pedestal 182 and the base 173. A network of such troughs extending through the manufacturing system will pick up chips, and cooling fluid and oil, from the machining processes and carry them to a point of disposal.

Figure 12:
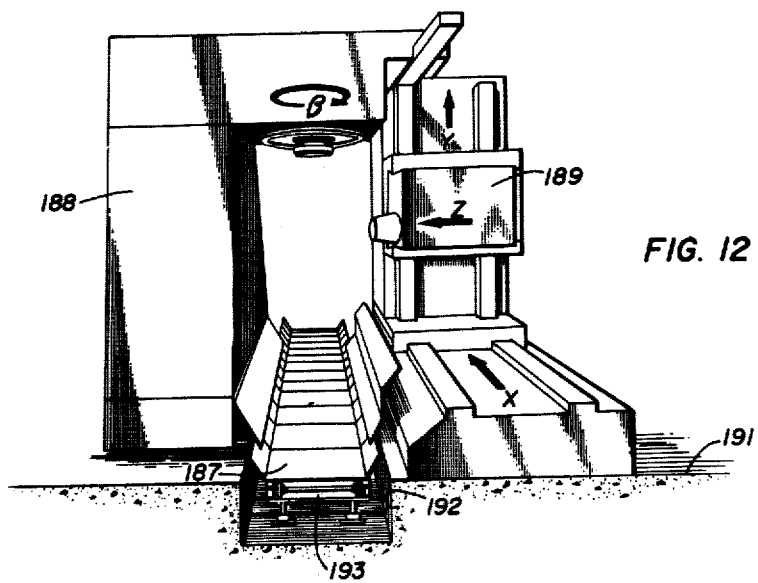
FIG. 12 is a perspective view of a modified form of the equipment shown in FIG. 11.

FIG. 12 shows a modified form of the chip removal apparatus in which, as before, a trough 187 extends between a pedestal 188 and a machine tool 189. In this case, however, the concrete floor 191 is provided with a trench 192 in which rests a support frame 193 for the trough. The trench will receive any overflow or leakage from the trough and can be flushed with water from time to time to remove debris of that kind.

Figure 13:
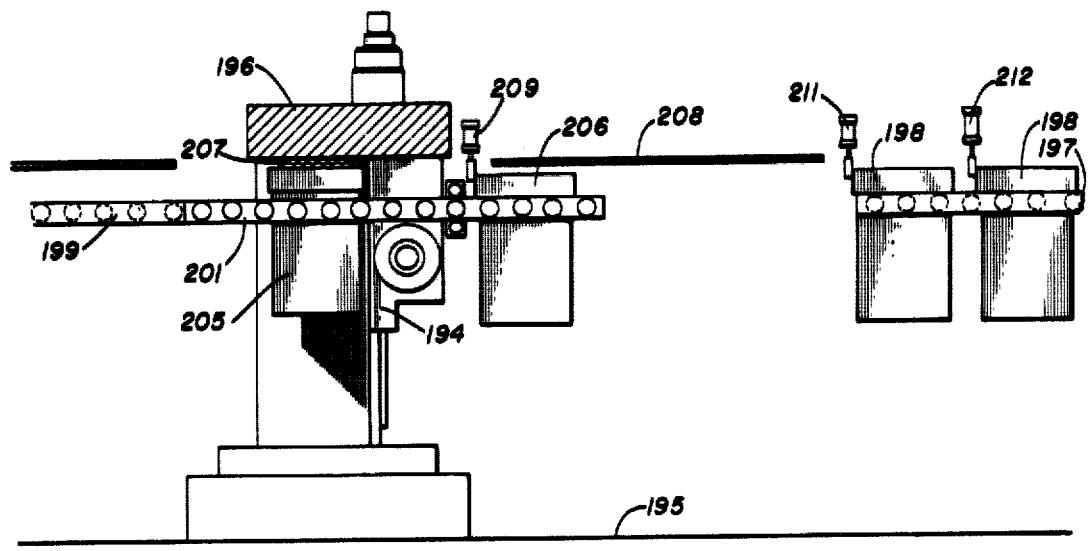
FIG. 13 is a somewhat schematic side elevation of a portion of the manufacturing system in a first condition.
Figure 14:
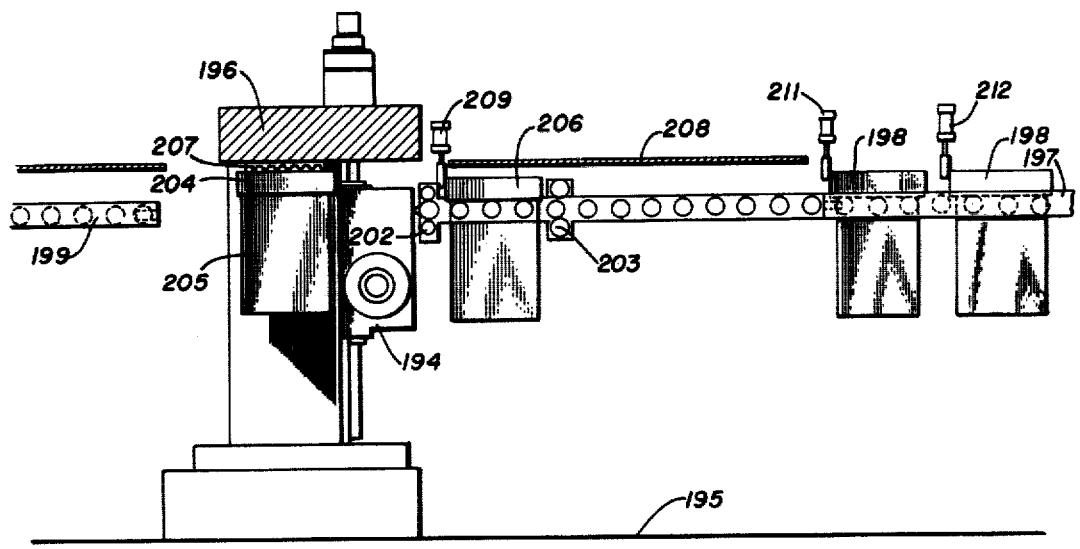
FIG. 14 is similar to FIG. 13, but shows the equipment in a second condition.

FIGS. 13 and 14 demonstrate the manner in which the apparatus is manipulated to bring the pallet and workpiece on the conveyor to a position underlying the abutment and to remove the conveyor from the work area once the pallet has been firmly connected to the abutment. A machine tool 194 rests on a floor 195 and is accurately related to a workpiece-cupporting abutment 196. The branch conveyor which extends past the machine tool consists of a fixed incoming section 197 which carries a queue of pallets 198 and their workpiece and a fixed outgoing section 199. Between them extends an intermediate section 201 which is longitudinally slidably mounted in roller guides 202 and 203. In FIG. 13, the intermediate section 201 is in a left-hand position close to the outgoing section 199 and connected thereto by a pin-and-socket arrangement; on it rests the current pallet 204 with its workpiece 205 and the next pallet 206 is in ready position on the section between the guides 202 and 203. Once the connector 207 has been actuated and the pallet locked to the abutment, the intermediate section 201 is drawn to the right, as shown in FIG. 14. The pallet 204 and its workpiece 205 hang suspended from the abutment and the area around the workpiece is free for the machine tool to perform its operations. Means is provided in connection with the connector 207 to rotate the workpiece to various angular relationships to the machine tool spindle. With the section 201 withdrawn to a position next to the incoming section 197 and connected thereto by a pin-and-socket arrangement, the first pallet 198 in the queue is free to move from the section 197 to the section 201. Then, when the machining operations on the workpiece 205 are finished, the section 201 will be moved to the left again to receive the pallet 204 (when the connector 207 is released). The pallet will move onto the outgoing section 199, while the next pallet 206 moves into position under the abutment.

In FIGS. 13 and 14 are shown the manner in which a canopy 208 overlies the conveyor and protects the pallets and workpieces from dust and debris. In this way, once the pallet has passed through the work station 40, the coded plate or identification code means 51 and the lower part of the connector 207 on the pallet can be kept clean. Also evident in these figures of the drawings is the presence of fluid-operated stops 209, 211, and 212 that regulate the movement of the pallets into the work area.

Figure 15:
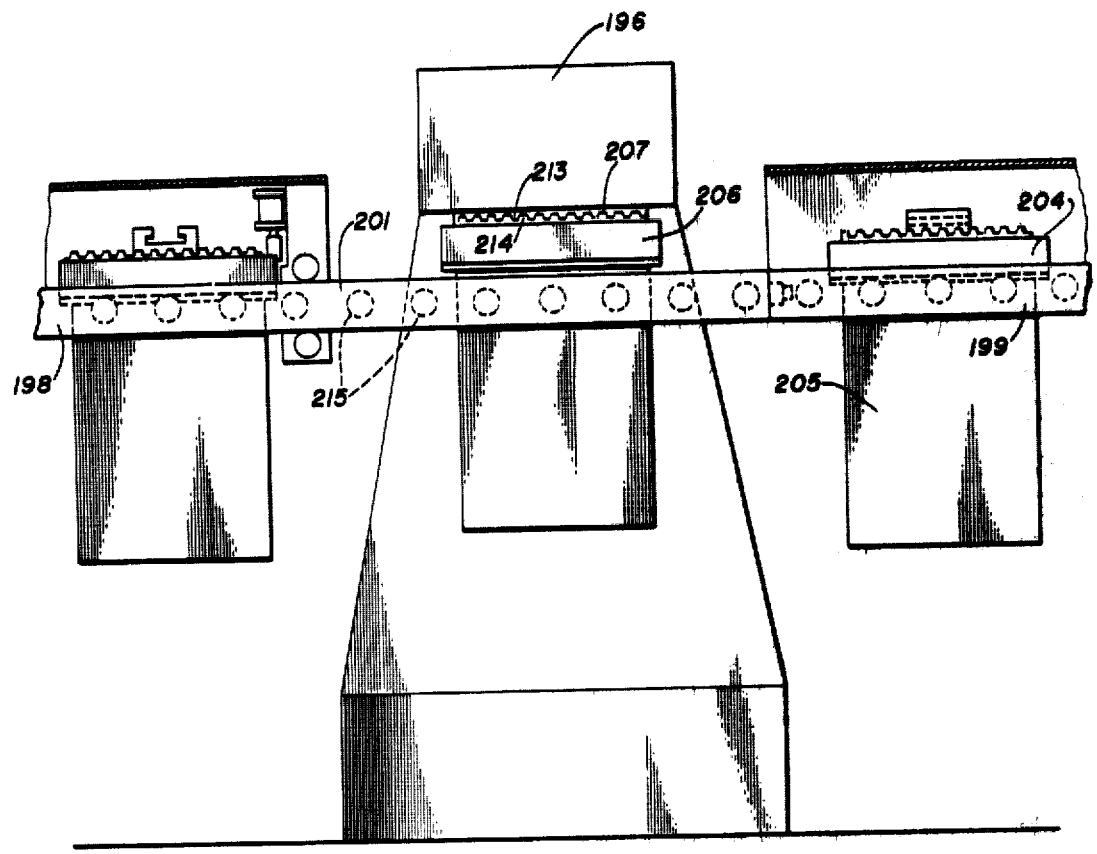
FIG. 15 is a side elevation, somewhat enlarged, of a portion of the apparatus shown in FIG. 13, FIGS. 16, 17, and 18 are vertical sectional views of a portion of the apparatus, showing various conditions thereof.

FIG. 15 shows the general relationship that exists between the pallets, the abutment 196 and the connector 207 as observed from the machine tool, the flow of pallets being from left to right. The connector is of the type shown and described in the patent application of Perry et al, Ser. No. 690,941, filed Dec. 15, 1967, for CONNECTOR and is formed in two parts; an upper part 213 attached to each abutment and a lower part 214 attached to each pallet, each part having a circular array of radial gear teeth which are complementary. The engagement of these teeth determines very accurately the position of the workpiece relative to the spindle of the machine tool, or to the operating components of any of the work stations. The drawings show clearly how the pallets normally rest on the rollers 215 of the conveyor and are driven by them along the conveyor;

when a pallet, such as the pallet 206, is connected and locked to the abutment 196 by the connector 207, it has been lifted from the conveyor, so that the conveyor can be temporarily removed, as has been described. The parts of the connector are provided with seals of the type shown and described in the patent application of Attermeyer Ser. No. 690,926, filed Dec. 15, 1967 for CONNECTOR; these seals prevent the accumulation of debris on the surfaces of the teeth in the connector, thus guaranteeing that the close tolerance of location between the workpiece and the machine tool is not disturbed.

Figure 16:
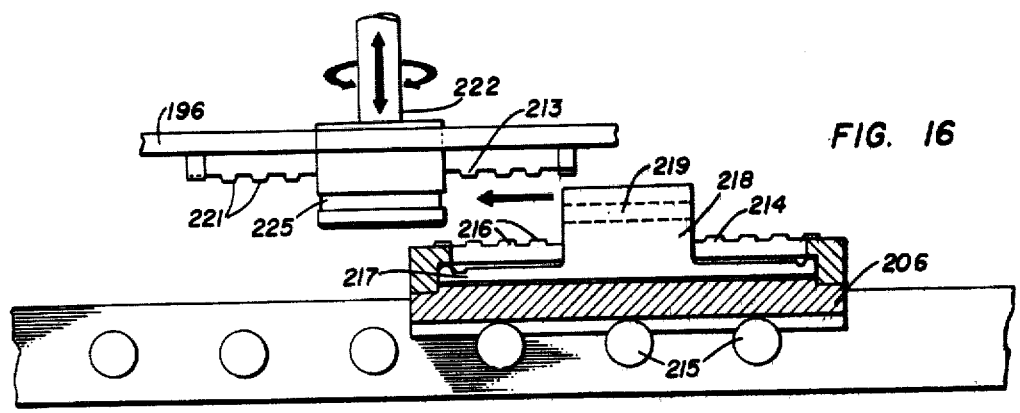
Figure 17:
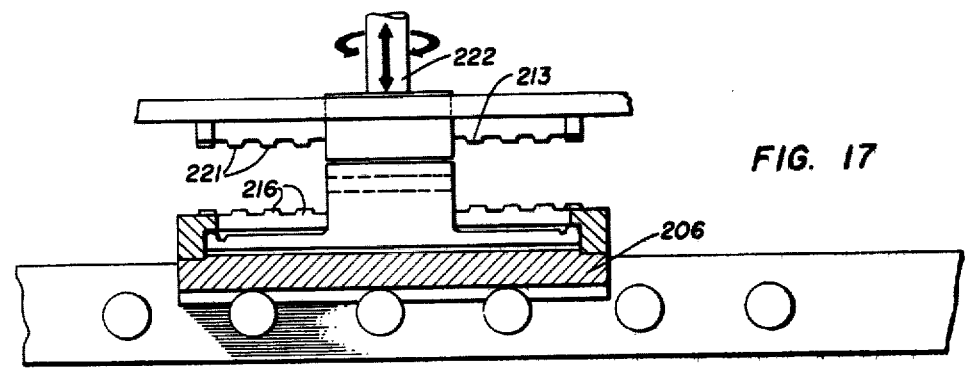
Figure 18:
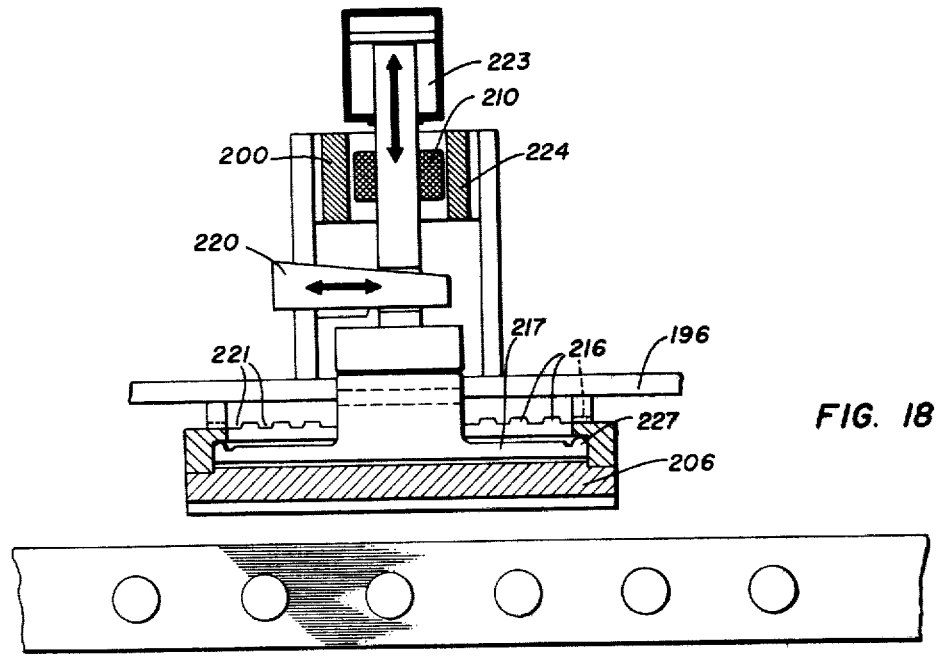

FIGS. 16, 17, and 18 show the manner in which the connector is operated to attach the pallet to the abutment. In FIG. 16, the pallet 206 with the lower part 214 of the connector extending upwardly from its upper surface rests on and moves along the rollers 215 of the conveyor. The pallet approaches the abutment 196 which has upper part 213 extending downwardly from its undersurface. The upper part is shown as an annular member formed with upwardly-extending projections such as radial teeth 216. Extending under the annular member is a diaphragm plate 217 having a central hub 218 formed with a T-shaped slot 219. The upper part 213 is also formed as an annular member having downwardly depending projections such as radial gear teeth 221. A shaft 222 is mounted centrally of the annular member and is provided with an actuator 223 to pull it upwardly. The shaft is also rotatable by a motor 224 which is of the electrical type having an elongated stator winding 200 which is much longer than the rotor winding 210 to permit rotation of the shaft 222 irrespective of its vertical location. The lower end of the shaft is provided with a T-shaped head 225 adapted to fit into the slot 219 of the lower part of the connector.

As the pallet approaches a position directly under the abutment, the head 225 enters the slot 219 and the situation exists that is shown in FIG. 17. The pallet and the abutment are loosely connected by the interengagement of the head with the slot. The weight of the pallet and its workpiece are still carried on the conveyor. The actuator 223 is then energized, thus drawing the shaft 222 upwardly and pulling the pallet 206 with it. The pallet is now removed from the conveyor rollers, but the teeth 216 and 221 are still some distance apart. The motor 224 can then be actuated to rotate the pallet and workpiece about the vertical axis of the shaft 222 so as to present a predetermined aspect of the workpiece to the machine tool.

Finally, as shown in FIG. 18, the complementary teeth 216 and 221 are drawn together tightly and the pallet is then very accurately located relative to the machine tool so that numerically-controlled machining operations can be performed on the workpiece with good results. The final clamping takes place by use of a wedge 220; the clamping forces are brought to bear directly behind the array of teeth 216 by use of a ridge 227 at the outer periphery of the diaphragm 217 which presses against the back side of the annular member that carries the teeth. In this way, the teeth are brought together with a predetermined force that does not distort the parts and detract from their locating function.

Figure 19:
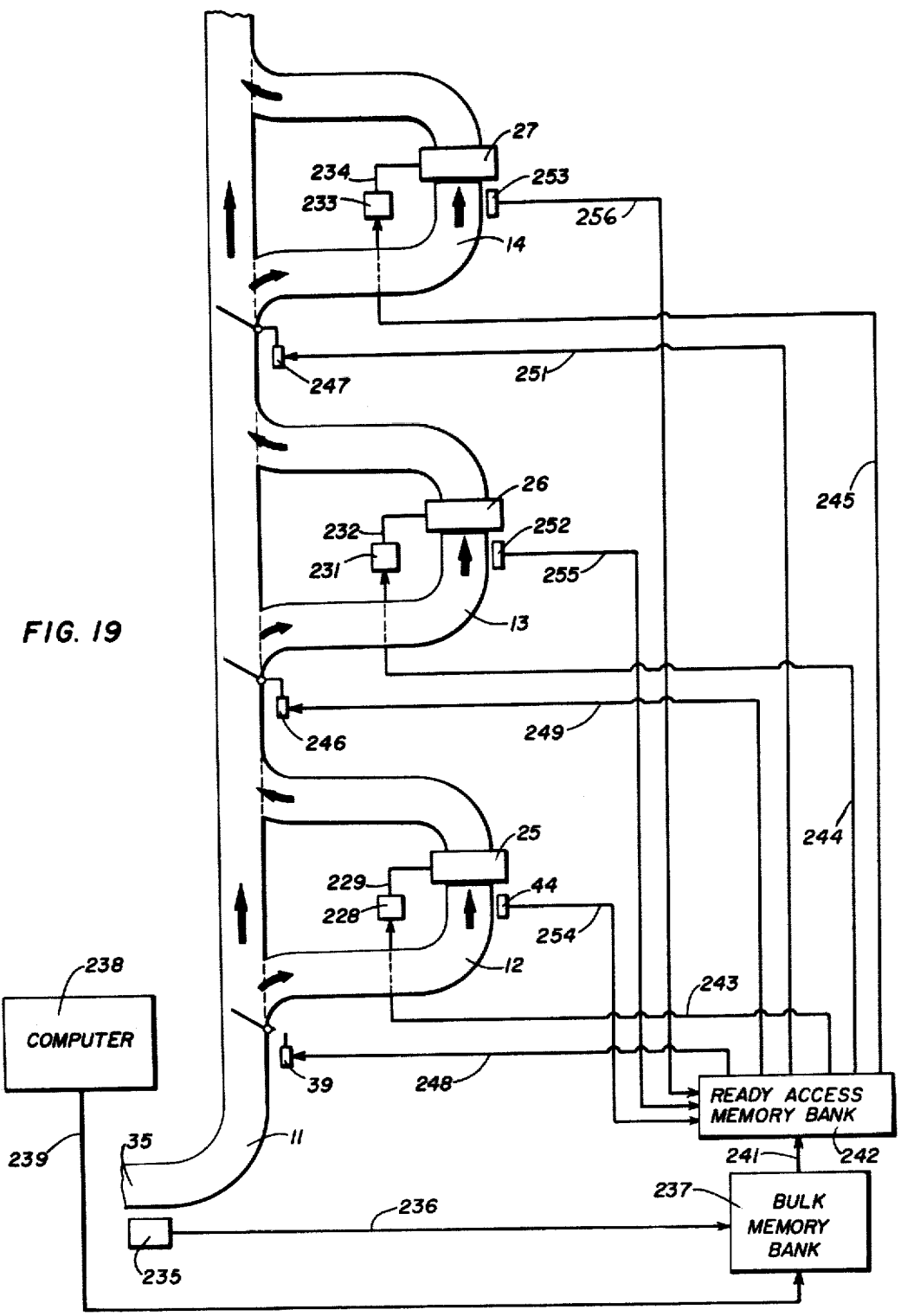
FIG. 19 is a schematic view of the system showing the control apparatus.

FIG. 19 shows a part of the control apparatus for the system. A portion of the main loop conveyor 11 is shown with three brach conveyors 12, 13, and 14. A numerical control cabinet 228 is connected by a scale 229 to the work station 26, a cabinet 231 by a cable 232 to the work station 26, and a cabinet 233 by a cable 234 to the work station 27. At the end of the staging area 35 is an operator's information transmitter 235; when the operator places a particular part or workpiece on a pallet he punches into the transmitter the information that a certain part number is attached to a certain coded pallet. The control apparatus now knows two things: (1) that a certain kind of part is cruising in the conveyor network, and (2) that when a certain coded number appears on a pallet that this kind of part is present. This information is passed through a cable 236 to a bulk memory bank 237. This bank contains all the information necessary to process any of a large number of kinds of parts in the system. It contains information not only as to a preferred or primary route for the part or workpiece with its pallet to take through the network; in addition, it contains information as to an alternative or secondary route that is possible if the primary route cannot be taken at any time. As a matter of fact, every time a workpiece and pallet approach an intersection, the control must decide whether or not to allow it to enter the branch conveyor and this programmed information assists in this decision. Furthermore, the bulk memory bank contains stored information as to the operations to be performed by the various work stations for any one of a multitude of parts. Some of this information had previously been developed in a computer 238 on an off-time basis and fed to the bulk memory storage through the cable 239. In addition, the computer has been used to determine the optimum "mix" of parts or workpieces that should be introduced into the manufacturing system in order to assure that the machine tools are operated at their optimum efficiency.

Now, when the bulk memory storage bank 237 learns that a certain part is about to cruise through the network, it releases through a cable 241 to a ready access memory bank 242 all the information on the routing and machining of the part. This bank is connected by cables 243, 244, and 245 to the numerical control cabinets 228, 231, and 233, respectively. The ready access memory bank also makes the information on routing available to first identification readers 39, 246, and 247 through cables 248, 249, and 251, respectively. Secondary identification readers 44, 252, and 253 are located in the branch conveyors 12, 13, and 14, respectively, and are connected back to the ready access bank 242 by cables 154, 255, and 256. First of all, the secondary reader determines the coded number of the pallet and asks the ready access memory bank whether or not the pallet should be approaching the particular machine tool. Once the presence of the pallet (with its known kind of part) is determined to be proper, then the bank releases operating instructions to the numerical control cabinet associated with that machine. Just as the pallet stood in a queue in the branch conveyor ahead of the machine tool, so are the operating instructions for that particular part stored in queue in the cabinet.

Figure 20:
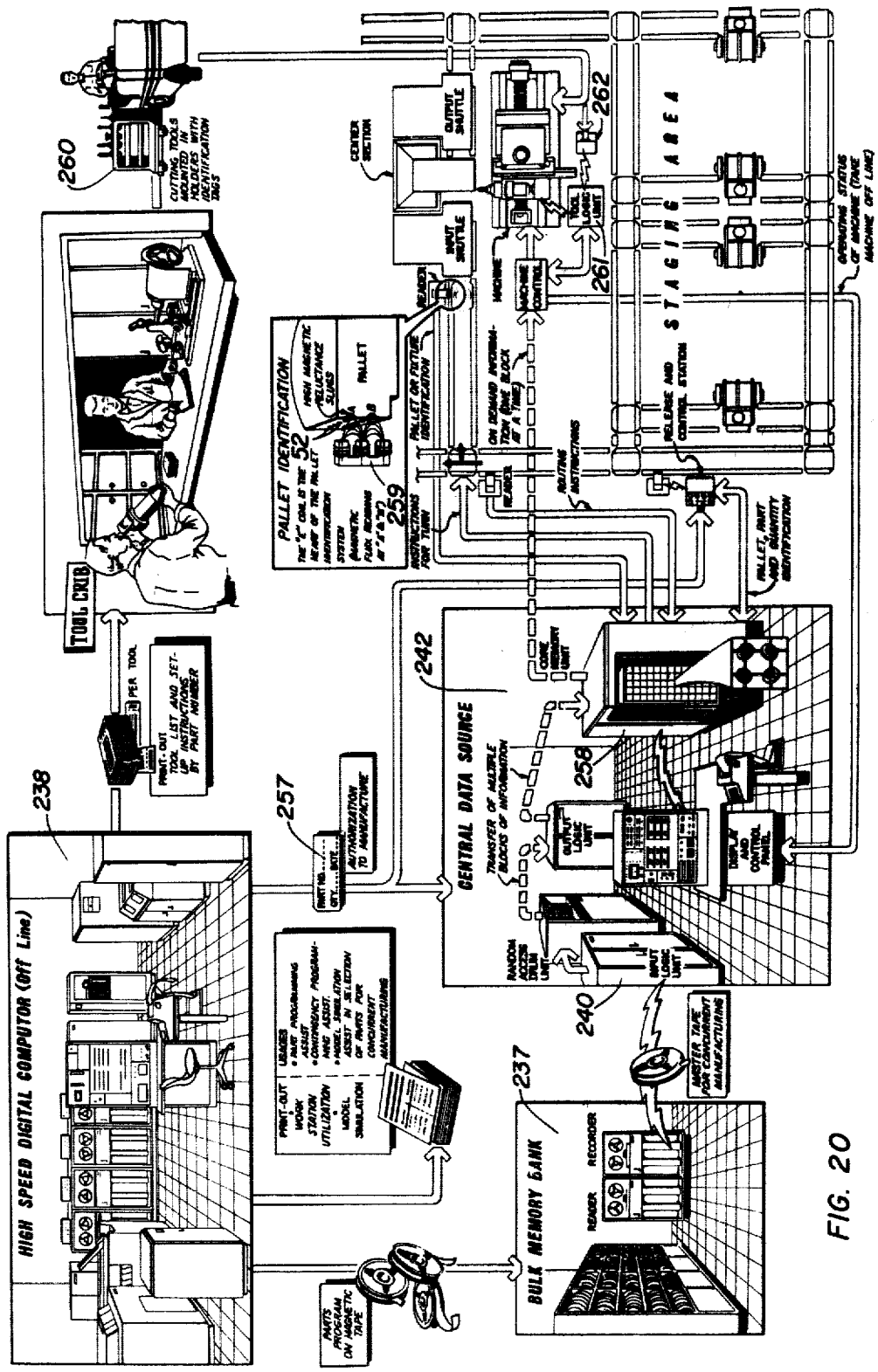
FIG. 20 is an illustrative view further showing the control system.

Referring now to FIG. 20, which is a diagrammatic representation of the sub-systems required for control of a manufacturing system according to the invention, an off-line computer 238 will be used in the following ways: Assist the part programmer in the preparation of part programs; assist in the development of contingency solutions by means of post processing routines; and by model simulation assist in the selection of part numbers to be concurrently produced by the system. The preferred computer for this off-line work would be large in capacity and high-speed in performance and of a digital design. The specific outputs from the computer would be (1) part programs on magnetic tape, (2) a printout of work station percent utilization as generated by the model simulation program and used to assist in selecting part numbers and production quantities to be run concurrently, (3) print out of cutting tool lists and set up instructions as developed by the part programmer.

Part program information on magnetic tape will be inputted to the bulk memory bank 237. The bulk memory bank 237 will have part program information organized by part number. The part program information would include the contigency program solutions should the preferred module for a particular operation be not available at the time the part is addressed to the station during manufacture. By means of model simulation programs performed on the off-line digital computer, a list of part numbers to be manufactured during a given period of the manufacturing systems application would be generated. This list of part numbers would be inputted to the bulk memory bank's input logic section and caused the program information on those part numbers to be relayed from the memory bank to a magnetic drum 240 random access storage unit in the central data source or ready access memory bank 242 of the system. In essence, the bulk memory bank 237 is a library of stored tape, each having a series of one or more part programs thereon. A suitable input logic gating means is provided serially between the bulk memory bank 237 and the drum means 240. At any given period of system operation, the magnetic drum random access memory 240 would contain all the program instructions for all the part numbers being concurrently run in the manufacturing system.

In the operation of the manufacturing system, workpieces will be mounted in fixtures or on the decks of pallets and prepared for release into the manufacturing area (See FIGS. 1 and 3) in the staging area 35. In this area the surfaces upon which workpieces are mounted will be automatically positioned at a convenient height and orientation for a man to load the raw stock into the fixture. Upon completion of such loading, the workpiece and its support structure will be automatically elevated and rolled over and positioned on the main conveyor system for subsequent movement out into the manufacturing floor. Parts mounted within their fixtures or on pallet decks will queue as they are prepared to leave the staging area and pass through a release and control station 31. At this station, the identification of the pallet or fixture will be automatically read and the identification of the part number and the total quantity of parts to be produced in this production run will be introduced manually or by means of a tabulating card 257 generated off-line. The information relative to the identification of the workpiece or fixture and the part number and the quantity of parts to be produced will flow from the release and control station to the core memory unit 258 in the central data source area. The primary function of the release and control station 31 is to correlate the identification of the means used to convey the workpiece with the identification of the workpiece. This provides a means whereby, as one identifies the pallets or fixtures as they move through the system, it is possible through the core memory units to correlate these two numbers and to know where individual part numbers are as they move through the manufacturing system. An additional function of the release and control station 31 is to keep track of the actual number of part numbers being produced. When a particular workpiece (part number) is first released through the release and control station, the number of parts to be produced in that run will be inputted via the tabulating card 257 or by manual entry through the panel. As that same fixture or pallet recycles through the release and control station, the number of parts produced will be recorded. When the last part is produced, the system will automatically inhibit further releasing of that pallet or fixture until the part number assigned to it has been changed.

As pallets and fixtures carrying workpieces leave the staging area through the release and control station, they move automatically on the main conveyor network out towards the work stations of the system. Preceding their arrival at each decision point (a point in the conveyor network where more than one direction of movement is possible), the identification of the pallet or fixture will be automatically read by reading heads. These reading heads are designed to read the identification of the pallet or workpiece off the flat surface of the pallet which, at time of manufacturing, has been prepared with a binary coded arrangement of high reluctance or non-metallic slugs 52 of material arranged in a predetermined pattern representative of the binary coded number representing the unique identification of that particular pallet or fixture. The method of detecting the presence or absence of these slugs of non-metallic material is by the use of an "E" coil pick-up detector 259 illustrated in FIG. 20. The operating principle of the E coil is to set up flux paths between the central element of the E and the outside legs of the E. An alternating current exciter is applied to the central E coil and two secondary windings are applied to the outboard legs of each side of the E respectively. The effectiveness of the flux path or flux moving in zones A and B is poor when the flux is passing through air and the output of the secondaries is extremely low. When it is passing through the solid metal body of the edge of the pallet or fixture, the output is very high; when the flux path is in juxtaposition with the dialectric or non-magnetic material slug, the flux path efficiency will be very low, almost equivalent of when it is passing through air. Ahead of each reading head is a wiper end, as the pallet approaches the reading head, the face will be wiped off. At the time of manufacture after inserting the non-magnetic slugs, this face containing the code will have been machined to be flush and easily cleaned by a simple wiping action.

As workpieces move around the primary dkstribution loop of the conveyor system, as illustrated on the system roadmap (FIG. 1), their presence in a particular area of the system is ignored by the central data source 242 until they approach a decision-making point at which time their identity is automatically read and transmitted to the core memory unit 258. Upon completion of such identification, the pallet or fixture is caused to come to rest until the appropriate instructions are received back from the core memory unit relative to the proper action to be performed by a turnstile 41. These turnstiles will normally be positioned to permit the work to flow through them without their taking jurisdiction of the work and diverting it from the main conveyor distribution path. At the time of programming, the programmer will have inputted the appropriate responses for each turnstile in the system as the part progresses in its processing from one station to another. Thence, when the part is being produced and reaches that turnstile, the appropriate instruction to the turnstile is waiting in sequence in the core memory unit 258 for immediate dispatch to the turnstile.

By the means thus described, it is possible to cause workpieces to move to any station in the system and from there to move to any subsequent station in a controlled sequence. The workpieces as they approach a particular work station will form a queue. The identity of workpieces in queue is not maintained by the central data source (except in the special case of machine modules requiring a long lead time to prepare themselves for the receipt of a particular workpiece, i.e., the cluster head tool changing module. When workpieces in queue have advanced to the point where they are the next workpiece to move in for engagement by the machine, their identity is read by a reading head and appropriate instructions are prepared for release by the core memory unit 258 upon registration of that fixture at the machine work station. The release of this information from the core memory unit is by direct wire to the machine control unit. Information will flow between the core memory unit and the machine control unit in bursts of digital data in segments consisting of a block of information (a typical block might consist of 30 lines of information of 8 bit density per line). The machine control unit will issue instructions to the tool logic unit (where such is present in the machine) and to the machine tool itself and will monitor the execution of such commanded instructions. Upon completion of a block of information, it will call for the next sequential block from the core memory unit of the central data source 242.

Many of the machine tool stations in the manufacturing system will require multiple cutting tools that must be automatically applied to the various wor,pieces addressed to them. The mechanics for bringing about the automatic application of the variety of cutters needed in a sequence is as follows:

1. At the time of programming, such unique cutting tool, whether it be an individual tool or a cluster head of tools in a predetermined pattern, is assigned a unique code number. This number is obtained from a tool coding manual in which blocks of numbers will be assigned in a logical manner to the various classes of cutting tools encompassed by the code system. For example, milling cutters with the rake angles appear in one block of numbers which, in turn, might be broken down by diameter, by number of teeth, by class of the cutting material, carbide, high-speed steel, or ceramic, etc. The code number assigned by the programmer to a particular cutter or cluster head of cutters includes not only the description of the cutter itself but a description of the elements required to adapt it to the spindle of the machine tool. In the case of a single spindle machine, the system required to bring about such an adaptation of a typical cutter might be as follows:

The cutting tool itself, the amount of penetration of the cutter tool required into the work, the cutting tool holder which might be a collet or a chuck or a tap holder, the cutting tool holder adapter usually required to adjust the axial position of the cutter tip in respect to the spindle adapter body, and the spindle adapter body designed to mate with the nose of the spindle of the machine tool. Since the tool coding manual would be present in the tool crib where the physical mounting of cutters and their adapters would be accomplished as well as in the part programming office, the tool crib attendant can physically execute the preparation of the cutters in their holders in a manner envisioned by the programmer at the time of programming. As soon as tool holders and cutters have been brought together and mounted in the manner prescribed by that tool code number, a tool identification tag would be prepared on a key punch machine looking very much like a typewriter would, with the primary difference being that it would only have ten keys representing 1 through 9 and a 0. The tool set-up man generates the tool identification tags by simply striking the keyboard in a manner representative of the number assigned to the tool he has prepared. As he strikes the keys, holes would be punched in a tool identification tag and the number is printed on the tag and on a tear-off strip. The number on the tear-off strip is removed from the tag and affixed to the flange of the tool holder he has just prepared. The tool identification tags and the preset tool holders and cutting tools are mounted in a transfer dolly 260 for movement out to the machine tools (See also FIG. 2). The preset cutting tools are loaded into the tool storage matrix of the machine and the tool identification tags are fed into the tool logic unit 261. The tool logic unit relates the identification of the tool with the storage location in the tool storage matrix.

The specific method by which preset cutting tools are introduced into the tool storage matrix of individual machine tools and the tool identification plates in introduced into the tool logic units associated with each machine tool as follows:

1. The tool storage matrix of each machine is equipped with a load and unload station at a location and orientation convenient for a man to handle the placing of tools in and out of the matrix. Adjacent to this load and unload station is the means of inhibiting the automatic rotation of the storage matrix during the performance of lead and unload operations and also the means of incrementally causing the matrix to move so that the appropriate tool for removal can be positioned at the station or that empty pocket to receive the new tool can be brought into appropriate position.
2. The present cutting tools and their holders are moved up close to the machine in the specially-prepared dolly 260 which positions the tool conveniently for a man to remove them and transfer them into the storage matrix and also protects the registration surface of the tool holders from dust and other contaminants.
3. A typical situation would involve the transfer of, say, fifteen present cutting tools into a zone of the storage matrix which has a series of adjacent pockets of adequate member to accommodate the input of new tools. In this case, the storage matrix is rotated until the first pocket in the empty area is brought to the transfer point. As each pocket arrives at the transfer point, the identification of the pocket is automatically introduced into the tool logic unit 261 concurrently with the individual tools progressively being loaded into pockets that are positioned at the transfer point. The tool identification plates are fed into a reader 262 associated with the tool logic unit. The design of this reader in conjunction with the design of the binary coded identification plates is such that the plates can be stacked up and consecutively fed through the reader automatically. This arrangement provides for the automatic entry of the appropriate tool numbers in conjunction with the appropriate storage location in the tool storage matrix that initially receives each consecutive tool.

Characteristic of multi-station manufacturing systems in which a variety of different part numbers flow in random order to various stations within the system is the problem of short-term overloading of individual work stations in the system. The concept and control philosophy of the manufacturing system of the invention is that one knows in advance if the long-term load on each work station in the system is within the capacity of each station of the system. This long-term load equalization will be accomplished by system model simulation on an off-line high-speed digital computer. Therefore, one has advance assurance that the mission assigned to the system for any particular time is within the system's capability; however, short-term overloads of particular work stations will occur cyclically within the execution of the mission. An ideal manufacturing system would have the ability to automatically accommodate these periodically-occurring, short-term overloads so that the total productivity of the system remains high and the average utilization of each of the work stations in the system is high.

The problem of short-term overloads is resolved in accordance with the invention by providing contingency solutions that are developed and incorporated in the part program at the time of initial programming. In the case of large systems involving many different stations, it is envisioned that contingency solutions in a series of echelons would be programmed. For example, if a part requires a large face to be dressed by a milling cutter, the preferred solution would be the smallest sized milling machine capable of generating the required cut with a single pass at the work. The programmer would set this up as the preferred solution. Upon completing the instructions to that particular module, he would proceed to determine which of the other machines in the system would be the next most efficient machine to perform the same operation. This might be a machine of considerably lighter construction and not capable of driving the cutter of adequate diameter to produce the cut in one pass. He would, therefore, as a contingency, assign the part to be milled by this alternative machine and would assign an appropriate cutter and would make the required member of passes to generate the cut. He would then ask himself what he would do should the second machine be not available at the time the part was ready for that operation and would proceed in this same manner to develop still another alternative solution. In addition to these pre-programmed contingency solutions, the system would follow certain logic disciplines such as if a particular machine has an excessive queue at the time a particular part is addressed to it, it might as a first alternative simply make a cruise around the main conveyor loop and try again. It might do this once, twice, or three times at the discretion of the operators in the central data source and their system control through the display and control panel. Still other standard solutions might be to send the part automatically to a holding area for a designated period of time and then out into the system. By the means afore-described, it is possible to achieve with very little human intervention the automatic bypassing of temporarily overloaded stations and make use of stations that are available, although less efficient for the performance of a particular operation. The automatic utilization of stations with lighter loads provides multiple benefits in system efficiency. If the machine were not going to be used anyway, then its inefficiency in a particular application is no penalty and by permitting it to perform an operation that would otherwise have stopped the progression of a particular part means that the overall system efficiency can remain high.

Figure 21:
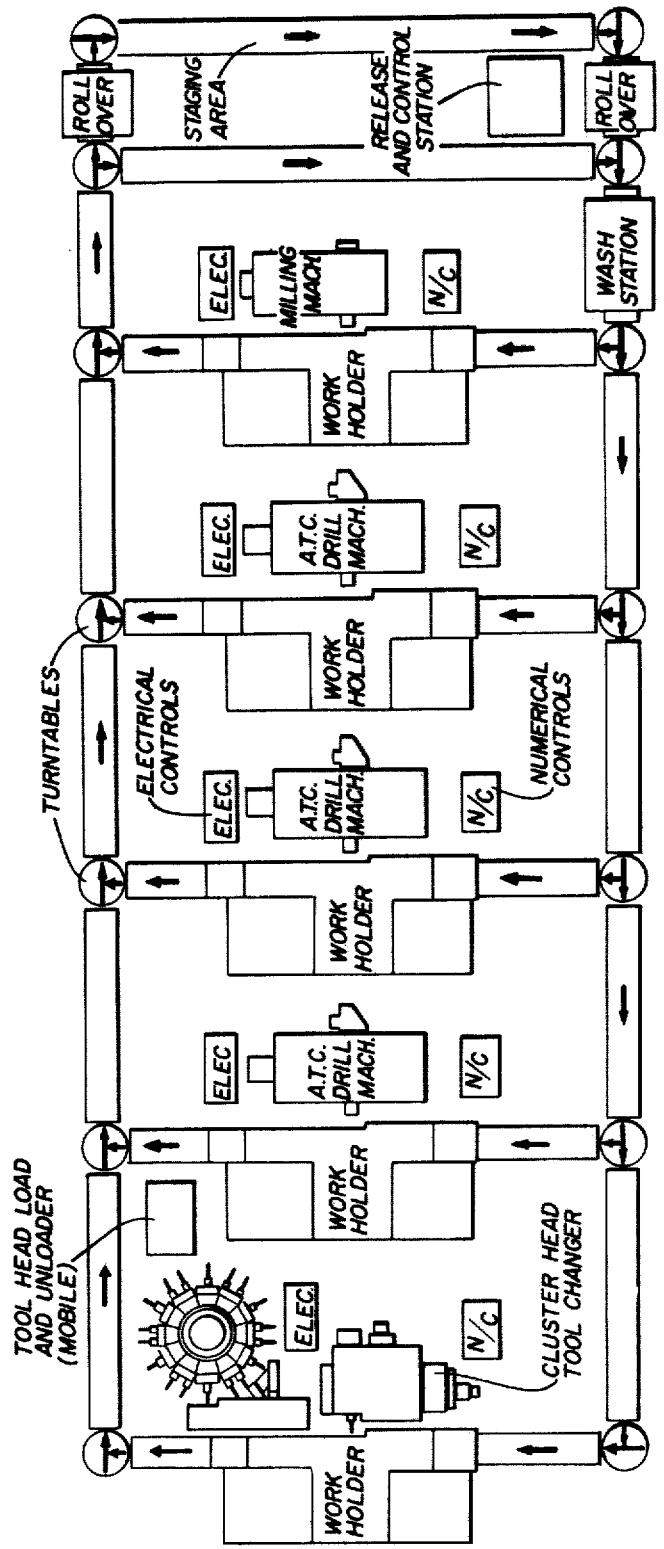
FIGS. 21, 22, and 23 show variations of the layout of the manufacturing system of the invention.
Figure 22:
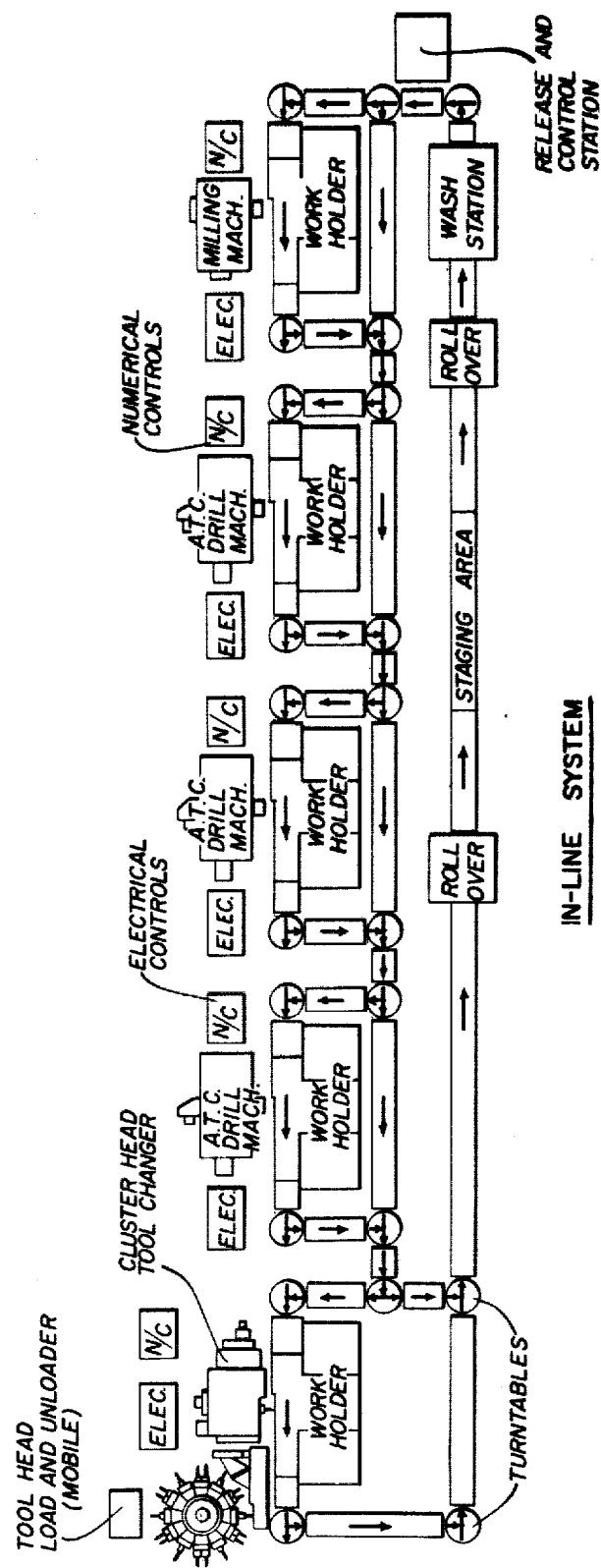
Figure 23:
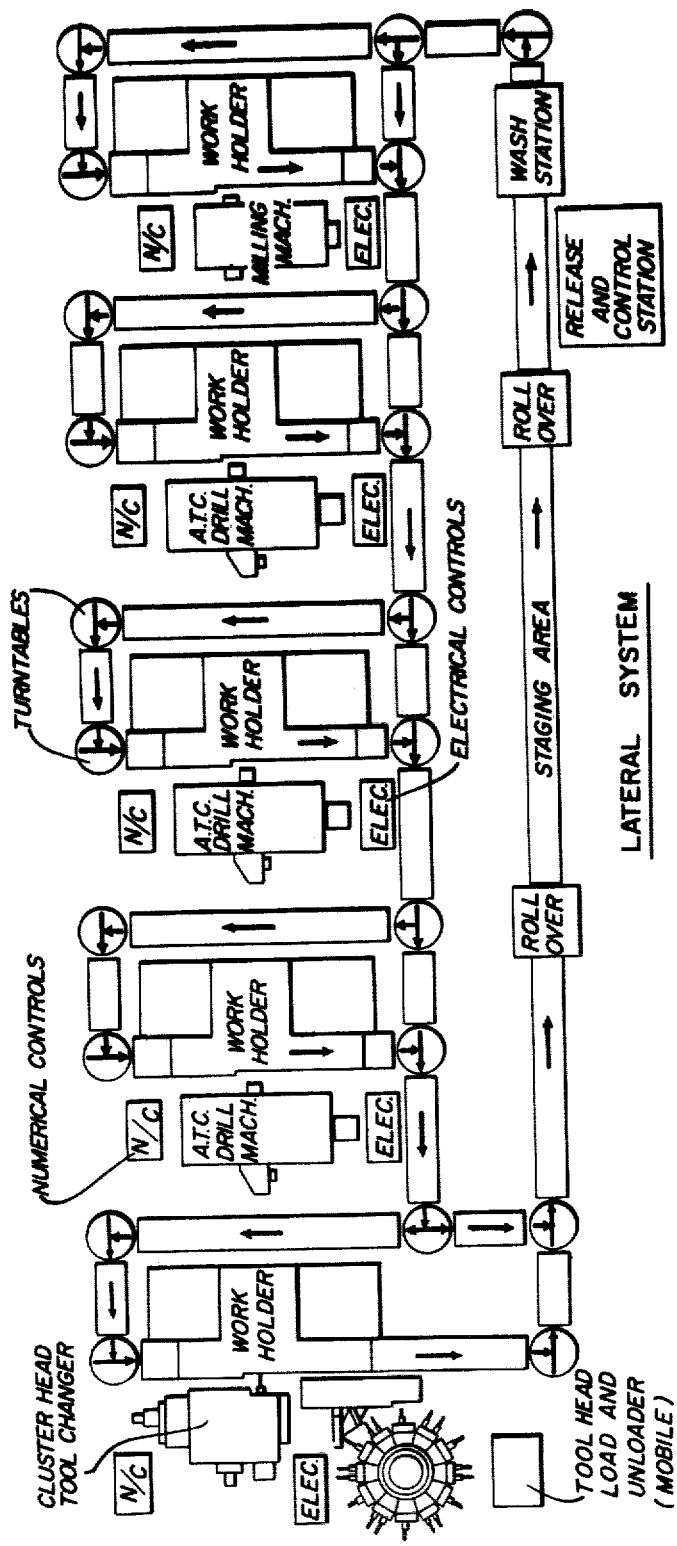

FIG. 21 shows a variation of the layout of the manufacturing system described above and best shown in FIG. 1; in this layout, the traffic on the secondary conveyors goes in one direction only, i.e., from one side of the main conveyor loop to the other. In FIG. 22 is shown a variation of the system layout in which the secondary conveyors are arranged in parallel with the main conveyor loop. FIG. 23 shows another variation of the layout similar to that shown in FIG. 22, but with the work stations and secondary conveyors oriented differently.

As has been described above, in the application of the manufacturing system, the parts are qualified, located, and clamped on the lower surface of a universal tooling base or pallet or fixture. The process of qualifying is accomplished either by foundry techniques or by performing a machining operation, such as milling a registry surface or generating a tooling hole. The lower surface of the pallet can be configured in optional ways to accommodate various requirements. One arrangement would be to install hardened and ground bushings in a symmetrical pattern over the surface. These bushings would be located precisely with respect to a registration system on the upper surface of the pallet. The lower surface of the bushings would be located just above the bottom surface of the deck and would be accurately controlled. At the bottom of the hole in which the hardened bushings were inserted would be a tapped hole of smaller diameter. With this arrangement, the individual bushings and associated holes could be used precisely to locate in the plane parallel to the lower surface of the pallet by using risers on the workpiece which would bear on the top of the bushing. Fostering could be accomplished by using hold-down bolts passing through the bushings and engaging the thread at the bottom of the hole. An alternative design of the lower surface of the pallet would be to use conventional precision-located key slots and to accommodate hold-down with conventional T-slots.

Various levels of controls are compatible with the manufacturing system that has been described. The highest level of system efficiency can be obtained with the control of the system by means of an on-line time sharing computer. This computer is supported by a high volume memory bank which contains all of the part programs for all of the parts in a currently active status for manufacture by the system. A major advantage of this system is that it provides real-time communication between the computer used for part programming and the on-line computer that will be used for control of the entire manufacturing process. No complex data translations from computer output to punch cards to punch tape to machine tape reader will be required. The rapid access memory bank of the on-line computer will have at any one time only information pertinent to the manufacturing of parts currently active in the manufacturing system or network. The expression "currently active" means that the part has passed from the staging area through release and control stations and has not cleared the station that represents the terminal routing point.

The computer releases machine-controlled information to each work station (machine tool) in the system on a "block at a time" basis. At each machine there is a control system capable of receiving information in short bursts from the control and remembering such information until its functions have been executed. This block-at-a-time retention capability is inherent in many numerical control systems presently in use.

Located through the system are reading heads capable of responding to the coded identification of the pallets, so that they pick up the identification of the pallets as they move past the reading heads. As each pallet approaches the points in its routing that require decisions, a reading head will advise the computer of the identity of the pallet. The computer relates the pallet identity to the identity of the part number carried on the pallet and then releases programmed instructions. In the case of the workpiece routing control, the program brings about automatic activation of the diverting means required to effect delivery to a work station or any other "address" in the system.

The computer has "lock-ahead" capability which is used in conjunction with contingency programming. Prior to releasing a pallet to a work station, the computer will find out if the work station is available to accommodate the part. The station may be out of operation due to work overload, cutter change, or breakdown. If the work station is not available for any of these reasons, the computer consults the contingency program instructions that are part of the program for that particular workpiece and routes the pallet and workpiece to the first alternate work station. Should that work station also be unavailable, the routing instructions would be to a second contingency station. This latter is envisioned as being a highly-versatile, numerically-controlled, tool changing machining center capable of performing any operations on any of the parts. Its efficiency would be considerably less than that of the specialized stations, but its versatility is very high. It not only provides an efficient means for contingency machining, but also substantially reduces the complexity (and, therefore, the cost and failure probability) of each of the specialized stations in the system.

The ability of the present manufacturing system automatically to accommodate itself to the contingencies described above greatly enhances its value. The incororation of contingency programming into the programming for each workpiece is a relatively advantageous operation. In fact, the programmer in so doing would be repeating the same operations at a different work station and adjusting his machine management decisions to accommodate the difference in the two work stations. In all cases, the preferred routing would represent the most efficient possible way to manufacture the part with the assortment of machine tools within the system. The first and second contingency programs represent progressive declines in machinery efficiency. However, the ability of the system automatically to bring about such decision making not only provides for an automatic solution to the normal problems that may be anticipated running such a system, but also permits much better work station utilization. For example, let us suppose that the schedules group of parts in various quantities for the day serve to overload the heavy-duty milling station by 10%, but a lighter-duty milling station had only a 20% load upon it. The day's production requirements would be met automatically by our system because, as the actual overload situation occurred, the heavy-duty milling station parts would automatically be diverted and would pass to the less efficient station that has low utilization for the day. The total system here has the ability to make such adjustments completely automatically and with a simple logic compatible with high total system reliability.

Implicit in this concept of automatic manufacturing is a means for effecting automatic routing of workpieces from work station to work station. Presently available automatic conveying means are used with relative minor modifications. Preceding each decision point in the routing is provided means for automatically reading the identification of the pallets. Incorporated into such reading stations are means for simply wiping off the surface of the pallet containing the code prior to the reading operation. Since it is envisioned that this surface is a flat machined plane, such wiping can be accomplished simply and reliably. After identification and processing of the pallet identification code by the computer, the computer issues instructions that effect switching of the conveyor to bring about the desired routing. The universal pallets fall into queue at each of the stations to which they are addressed. The identification of the next universal tooling pallet to be registered at a particular machine station is read just prior to its being activated at the machine. When a pallet leaves a station and the next one registers in at the machine, the control unit already has the first program instructions in its memory and would cause the machine to proceed to execute the machining operations as soon as pallet registration has been effected. After the pallet has delivered the workpiece to all required work stations and all machining and inspecting operations have been performed, the conveyor system delivers the part to a distribution network where automatic routing to the terminal location is accomplished. Terminal points for machine parts might be stockrooms, assembly areas, or a shipping room. Unclamping and freeing of parts from their pallets is accomplished at the head of the distribution network or at the terminal points. In either event, the pallets having been relieved of their parts, they are returned to the staging area by return line conveyors. Thus, routing from point of origin (foundry or receiving area) to point of use has been effected automatically and the device that supported the workpieces has been returned for reuse.

One of the philosophies behind the development of each of the work station elements is, first, that they are to be highly efficient from a metal cutting or process point of view. At some of the modules, this efficiency will exceed that which is normally obtained on fully automated transfer lines. The reason for this is that in a transfer line each station is time locked to every other station and there is, therefore, no requirement for a particular station to perform its work in a minimum time. Another major objective in the development of the work stations is that they must be capable of accommodating a very wide variety of workpieces. Thus, the twin objectives of high process efficiency and application versatility is basic to the philosophy of the present invention. Still another objective in the development of the work stations is that they have as much commonalty with one to the other as can be achieved without sacrificing the more significant objectives described above. The commonalty, for example, will be applied to the design of the entire base sections and the pallets with their associated movement and registration. It is envisioned that these base sections can be identical for most of the work stations in the system.

Each of the work stations is under the control of a numerical control unit located adjacent to or built into the module. This control unit is somewhat different in function and appearance to those in use today. The first difference is that there is no tape reader, since information is received from a central on-line time sharing computer. The second difference is the total absence of operator oriented manual inputs and displays. Since the work stations will operate without requiring a man to be present, and since the operation is entirely automatic, the requirement for such features is non-existent. Each control unit is capable of receiving program instructions from the central computer on a block-at-a-time basis. Information receipt will be compatible with computer output rates. In the preferred embodiment, the bit capacity of this memory unit is in the order of 320 bits maximum (40 lines on 8-channel tape). The principle of "canned cycles" will be applied where an unvarying re-occurring event sequence is compatible with the function of the work station. For example, on the milling station the canned cycle will automatically bring about Z-axis retraction upon completion of the milling pass and the rapid traverse return of the carrier to the start position required for the next cutting operation. As soon as stored instructions in the control have been dumped from the memory bank, the computer is notified and a new block of information is delivered.

Some of the features of the present invention are as follows:

1. The arrangement is provided for limiting the intelligence that must accompany the workpiece throughout the system to the identity of the work conveying means (pallet). A one, two, or three digit code (depending on system size at a particular installation) is built into the pallet at the time of its manufacture. This suffices to identify to the on-line computer the part that is currently mounted on the pallet and moving through the manufacturing system.
2. Means is provided for identifying the pallet by means of a code built into it at the time of manufacture. This code is relatively indestructible and is capable of surviving in the "hostile" environment of the manufacturing system. Such identification means is insensitive to oil, dirt, chips, vibration, shock, and is so installed within the pallet surface that simple automatic wiping techniques prior to passing the surface in front of the reading heads are adequate preparation for reading.
3. A system is provided for reading the coded identity of the pallets that requires no physical contact with the pallet, has no moving elements, and is extremely rugged and reliable.
4. A "release and control station" is provided that automatically relates the identity of the pallet with the identity of the workpiece mounted thereon and relays such information to the on-line computer. This station also relays "staging" information to those work stations in the system so requiring. The part identification and "staging" information (along with a wide variety of other intelligence required for system operation and associated displays) is imputed by means of a tabulating card. The tabulating card reader is installed in such a way that at the time of reading the pallet identification the intelligence on the tabulating card also would be read. This tabulating card will constitute the authorization to make the particular part mounted on the pallet.
5. Means is provided for automatic routing control by means of identification of the pallet by reading heads located throughout the system and the on-line computer linked with reading heads and the associated conveyor switching means.
6. Automatic queueing is accomplished by having the propulsion system of the conveyor simply moving the pallets toward their addressed stations.
7. The system provides for queue length determination that will permit the entire system to function automatically and to ignore queue length until it becomes excessive. Each work station has a predetermined maximum queue length and a detector that automatically signals the on-line computer should the queue length exceed that predetermined maximum. Such a signal to the computer triggers the diverting of work around that work station until the queue length again becomes acceptable. This automatic ability to accommodate temporary overload of the work station by means of the queue length detector and contingency programming in the computer will substantially enhance the overall value of the system.
8. A system is provided of block-at-a-time release of information to control units located at each machine tool. The control units at the work stations have relatively low-volume, high-speed memory capability suitable for receiving short bursts of information comprising density of some 320 bits maximum. Such information is received at the rate compatible with the computer's output. The control units are stripped of displays and manual input devices. The control units are equipped with "canned cycle" capability, however, the specialized nature of the stations limits the number of "canned cycles" required.
9. The system also provides for cluster head module build-up, high density storage, ready access storage, and automatic exchange at a machine tool. The principle is used of high density storage and its inter-relationship to the release control station that permits removal of desired cluster heads from the high density storage matrix prior to the arrival of the part requiring that head at the cluster head drill station.
10. A specialized versatile horizontal boring mill is provided equipped with two spindle carriers with a numerically controlled variable centerline-to-centerline capability.
11. The system uses a computer program to be run on a computer other than the on-line controlling computer that would be used to plan the production missions for the system. The concept here is that the program processes the work load on each of the modules that is generated by a production run of part types in quantities dictated by scheduled requirements. The computer identifies any work station overloaded by such a run, and identifies any available leftover capacity on any of the work stations. It then determines what workpieces (in the form of spare parts, service parts, experimental work, or advance release of normal production work) would constitute a good "fill-in" load. The fact that the system is capable of making contingency routing changes automatically permits short term overload of work stations with no efficiency penalty in terms of total system productivity. In fact, in effect, it increases the overall system's production capability and greatly simplifies the task of planning the particular mix of parts that will constitute the planned mission for the system for a given period of operation.

In the practice of the invention, there is no requirement that the work pass through stations not required for processing. Work can be automatically delivered from one station to any other station in the system in any sequence ordering.

The inventive system differs radically from the present method which is referred to as "batch manufacturing" in which a "batch" of identical parts are processed across each of the stations in group formation. By providing a system that can accommodate the parts in random sequence, a major reduction in the investment required for production tooling may be obtained.

It can be seen from the above, then, that the present invention provides many advantages. In the case of manufacturing machined parts, high metal cutting efficiency has hitherto been available in an automatic manufacturing system only at the sacrifice of system versatility. Manufacturing systems with good versatility have been usually relatively inefficient from a metal cutting point of view; this has been especially true of numerically-controlled machining centers. This invention provides a means for obtaining very high application versatility. A basic principle of this invention is to use work stations (that may be machine tools) that are conceived around extremely high process specialization and efficiency and provide a means of automatically applying such stations to a wide variety of workpieces.

The invention having been thus described, what is claimed as new and desired to secure by Letters Patent is:

1. A manufacturing system for diverse workpieces, comprising:
   (a) a plurality of machine tools,
   (b) identifying means associated with each workpiece,
   (c) a conveyor associated with the machine tools for conveying workpieces and having a primary section, a branch section connecting the primary section to each machine tool, and diverting means associated with each branch section and responsive to a control signal for selectively diverting a workpiece from the primary section to any of said branch sections, each of said branch sections having an inlet portion leading from said primary section to the machine tool and an outlet portion leading from the machine tool to said primary section, said inlet portion being of sufficient length to enable a queue of workpieces to accumulate;
   (d) detector means associated with the conveyor for sensing and identifying each workpiece on the conveyor and the accumulation of workpieces in a queue in each branch section, said detector means producing sensing signals indicative of each workpiece along the conveyor and the queue length of workpieces in each branch section, and
   (e) control means including a computer and a program memory associated with the computer for storing a primary program of operations to be performed by the machine tools on the workpieces and at least one contingency program, said control means being responsive to said sensing signals for generating control signals to said diverting means for direction workpieces along the conveyor in accordance with said primary program and for shifting to a contingency program for those workpieces that would otherwise enter a branch section in which the queue length of workpieces exceeds a predetermined number of workpieces.

2. A manufacturing system as recited in claim 1, wherein the diverting means comprises at least one turntable for each branch section.

3. A manufacturing system as recited in claim 1, wherein each workpiece is mounted on a pallet and the identifying means associated with the workpiece is mounted on the pallet.

4. A manufacturing system as recited in claim 1, wherein said branch sections intersect said primary section at decision points and said diverting means are located at said decision points, said detector means comprising a workpiece identification reader at each of said decision points.

5. A manufacturing system as recited in claim 1, wherein the detector means comprises:
   (a) a primary workpiece identification reader located on the conveyor at a point upstream of the diverting means for each of said branch sections, and
   (b) a secondary workpiece identification reader located on the inlet portion of each said branch sections for identifying the leading workpiece in the queue.

* * * * *